US012811877B2

(12) United States Patent
Azzam et al.

(10) Patent No.: US 12,811,877 B2
(45) Date of Patent: Nov. 24, 2026

(54) SYSTEMS AND METHODS FOR MANAGING DATA PACKET COMMUNICATIONS

(71) Applicant: DEJERO LABS INC., Waterloo (CA)

(72) Inventors: Imad Azzam, Waterloo (CA); David Pui Keung Sze, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 0 days.

(21) Appl. No.: 17/633,540

(22) PCT Filed: Aug. 7, 2020

(86) PCT No.: PCT/CA2020/051090
§ 371 (c)(1),
(2) Date: Feb. 7, 2022

(87) PCT Pub. No.: WO2021/022383
PCT Pub. Date: Feb. 11, 2021

(65) Prior Publication Data

US 2022/0294727 A1 Sep. 15, 2022

Related U.S. Application Data

(60) Provisional application No. 62/884,514, filed on Aug. 8, 2019.

(51) Int. Cl.
*H04L 45/24* (2022.01)
*H04L 43/0888* (2022.01)
(Continued)

(52) U.S. Cl.
CPC ........ *H04L 45/245* (2013.01); *H04L 43/0888* (2013.01); *H04L 43/106* (2013.01);
(Continued)

(58) Field of Classification Search
CPC ....... H04L 47/56; H04L 47/10; H04L 47/193; H04L 47/32; H04L 69/163; H04L 47/25;
(Continued)

(56) References Cited

U.S. PATENT DOCUMENTS 7,616,585 B1 11/2009 Kritov et al.
2003/0221008 A1 11/2003 England et al.
(Continued)

FOREIGN PATENT DOCUMENTS

WO 2018/112657 A1 6/2018

OTHER PUBLICATIONS

Zhang, "An Optimized BBR for Multipath Real Time Video Streaming", Jan. 2019 (Year: 2019).*
(Continued)

*Primary Examiner* — Messeret F Gebre
(74) *Attorney, Agent, or Firm* — Norton Rose Fulbright Canada LLP

(57) ABSTRACT

A system for managing data packet delivery flow where one or more data packets are being communicated across a set of multi-path network links, is described in various embodiments, the system adapted to monitor an aggregated throughput being provided through the set of multi-path network links operating together and to conduct packet spacing operations by modifying characteristics corresponding to at least one data packet of the one or more data packets based at least on the monitored aggregated throughput such that if the one or more data packets are being communicated at a faster rate than the monitored aggregated throughput, the one or more data packets are delayed such that the one or more data packets appear to be communicated at a required pace.

19 Claims, 17 Drawing Sheets

(51) Int. Cl.
*H04L 43/106* (2022.01)
*H04L 47/125* (2022.01)
*H04L 47/25* (2022.01)
*H04L 47/28* (2022.01)
*H04L 47/41* (2022.01)

(52) U.S. Cl.
CPC ............ *H04L 47/125* (2013.01); *H04L 47/25* (2013.01); *H04L 47/28* (2013.01); *H04L 47/41* (2013.01)

(58) Field of Classification Search
CPC ....... H04L 47/41; H04L 45/24; H04L 47/564; H04L 45/123; H04L 45/54; H04L 47/125; H04L 45/245; H04L 43/0888; H04L 43/106; H04L 47/28; H04L 47/19
See application file for complete search history.

(56) References Cited

U.S. PATENT DOCUMENTS

| | | | | |
|---|---|---|---|---|
| 2008/0225728 | A1 | 9/2008 | Plamondon | |
| 2008/0259967 | A1* | 10/2008 | Laulainen | H04L 69/28 370/503 |
| 2014/0241164 | A1 | 8/2014 | Cociglio et al. | |
| 2014/0269359 | A1* | 9/2014 | Roskind | H04L 43/0882 370/252 |
| 2014/0269769 | A1* | 9/2014 | Gresham | H04L 47/34 370/474 |
| 2018/0212885 | A1* | 7/2018 | Contavalli | H04L 47/28 |
| 2018/0254979 | A1 | 9/2018 | Scahilli et al. | |
| 2019/0379597 | A1* | 12/2019 | Kolding | H04W 28/065 |
| 2020/0336938 | A1* | 10/2020 | Bjornstad | H04W 28/065 |

OTHER PUBLICATIONS

Claypool, "BBR'—An Implementation of Bottleneck Bandwidth and Round-trip Time Congestion Control for ns-3", Jul. 2017 (Year: 2017).*
Takano, "Design and Evaluation of Precise Ssoftware Pacing Mechanisms for Fast Long-Distance Networks", 2014 (Year: 2014).*
C.-Y. Luo, N. Komuro, K. Takahashi and T. Tsuboi, "Paced TCP: A Dynamic Bandwidth Probe TCP with Pacing in Ad Hoc Networks," 2007 IEEE 18th International Symposium on Personal, Indoor and Mobile Radio Communications, Athens, Greece, 2007, pp. 1-5 (Year: 2007).*
S. Soltani, K. Misra and H. Radha, "On Link Layer Prioritization for Wireless Communication," 2011 Proceedings of 20th International Conference on Computer Communications and Networks (ICCCN), Lahaina, HI, USA, 2011, pp. 1-6 (Year: 2011).*
CIPO, International Search Report and Written Opinion against PCT Application No. PCT/CA2020/051090, Nov. 3, 2020.
European Patent Office (EPO), Supplementary Search Report and Opinion issued to EP 20849867.5, Aug. 3, 2023.
Usach Regel Gonzalez et al: "Implementation and Evaluation of Coupled Congestion Control for Multipath TCP", Aug. 29, 2012 (Aug. 29, 2012), SAT 2015 18th International Conference, Austin, TX, USA, Sep. 24-27, 2015; [Lecture Notes in Computer Science; Lect.Notes Computer], Springer, Berlin, Heidelberg, pp. 173-182, XP047376005, ISBN: 978-3-540-74549-5.
Canadian Intellectual Property Office (CIPO), Examiner's Requisition to CA 3,149,828, Mar. 7, 2024.
Japanese Patent Office (JPO), Office Action from JP 2022-506839 dated Aug. 20, 2024.
IP Australia, Examination Report No. 1, Application 2020326739, dated Jan. 9, 2025.
An Optimized BBR for Multipath Real Time Video Streaming, Zhang, S et al., dated Jan. 29, 2019.
Innovations, Science and Economic Development Canada (CIPO), Office Action Report, Application 3,149,828, dated Apr. 14, 2025.

* cited by examiner

SYSTEMS AND METHODS FOR MANAGING DATA PACKET COMMUNICATIONS

CROSS REFERENCE

This application is a non-provisional of, and claims all benefit, including priority to, U.S. Application No. 62/884,514, filed Aug. 8, 2019, entitled "SYSTEMS AND METHODS FOR MANAGING DATA PACKET COMMUNICATIONS", incorporated herein by reference in its entirety.

This application is related to PCT Application No. PCT/CA2017/051584, also related to U.S. application Ser. No. 16/482,972, both entitled "PACKET TRANSMISSION SYSTEM AND METHOD", filed Dec. 21, 2017, incorporated herein by reference in its entirety as well.

FIELD

Embodiments of the present disclosure generally relate to the field of electronic data communications, and more specifically, embodiments relate to devices, systems and methods for managing data packet communications.

INTRODUCTION

Data packet transmission across communication links are impacted by congestion issues that arise, for example, due to various communications bottlenecks. Accordingly, networked communications utilize buffering and pacing approaches in an attempt to reduce congestion issues to help improve data packet communications (e.g., fewer lost packets, improve overall throughput).

For example, TCP data packet pacing can be utilized as a mechanism to control the burstiness of packets transmitted by a TCP sender that is ACK clocked (i.e., one that sends packets inflight based on a congestion window rather than a specific transmission rate).

Congestion issues are a major cause of reduction of quality of service through communication networks. Pacing problems, in particular, lead to network congestion that yields particular technical problems as noted above in respect of "handshaking" or other error correction protocols where there are specific receipt requirements that can be impacted by lost or out of order packets.

The specific protocol-based requirements, when disrupted, cause further downstream issues such as inadvertent re-transmission of packets thought to be lost, further degrading performance. Accordingly, it is possible in some scenarios that performance degradation continues to perpetuate.

SUMMARY

As described herein, data communication modification approaches are proposed to solve discrete technical problems associated with data packet pacing and/or timing. The approaches provide specific technical solutions which are adapted to modify data packet pacing to restore original pacing/to establish a new pacing, thereby improving overall data transmission characteristics, such as reducing congestion or reducing the impact of "bursty" communications. The improved pacing helps in situations, for example, where a burst is so large that a buffer limit is overwhelmed and packets are incorrectly dropped as a result (premature drops).

Alternate proposed embodiments are described as well, for example, specific approaches to determining/establishing pacing based on using packet monitoring or flagging approaches to distinguish between actual data payloads and redundant payloads (e.g., forward error correction payloads). Various approaches were experimentally validated through testing of variant scenarios where pacing was disabled, enabled, modified, etc., monitoring and verifying how the timing of the bursts impacted overall network communications quality.

The approaches described herein can be established as physical networking device (e.g., a router, a sequencer, a hub, a multipath gateway, a switch, a data packet forwarder), computer implemented methods performed by a physical device, and/or software or embedded firmware in the form of machine-interpretable instruction sets encoded thereon non-transitory computer readable media for execution on a coupled processor or processors.

In particular, the physical networking device can be adapted to modify or otherwise establish a routing table or routing policy stored on a data repository/storage medium which controls the directing and/or routing of the data packets encountered by the physical networking device.

In some embodiments, the physical networking device is adapted for in-flight modifications. In other embodiments, the physical networking device can be adapted or coupled to a receiver node and conducts sequence correction/pacing modifications prior to provisioning to the receiver node (e.g., as a re-sequencer). This is particularly useful in situations where an existing networking infrastructure is adapted for retrofit. In further embodiments, both an in-flight modifier device and an endpoint re-sequencer device can be used in concert.

Illustrative descriptions are provided herein. In a single communication link scenario, data packet communications protocols can be conducted as a direct negotiation between a sending device and a receiving device. However, where there are multiple communication links being utilized together, for example, as a bonded set of connections, there are increased technical challenges in relation to data packet buffering and data packet pacing. Multiple communication links being utilized together are particularly useful in scenarios where singular communication pathways are unreliable or do not provide suitable transmissions by themselves.

Example scenarios include scenarios where large video or bulk data transmissions are required (e.g., live-casting at a major sporting event where heavy network traffic is also present), rural communications (e.g., due to geographical distance and spectral interference from geographic features), or in emergency response situations (e.g., where primary communication links are not operable and secondary communication links are required).

Data packet management is beneficial as throughput can be modelled as a function that is inversely correlated to the data packet loss rate (for example, TCP throughput is commonly modeled as inversely proportional to the square root of the loss probability). However, packet management approaches that are utilized between communications across singular links are sub-optimal for multiple communication links being used together.

As described herein, technical solutions are proposed in relation to technical data packet and data buffer/queue management mechanisms, including physical networking devices (e.g., improved router), network traffic controllers, and corresponding methods and computer program products (e.g., non-transitory computer readable media storing machine-interpretable instructions for execution on a processor) adapted for use with multiple communication links being utilized together. For example, the packet spacing operations of some embodiments are adapted to restore to the data packets a packet communications pace substantially similar to pacing if the data packets were communicated across a single network link. Specific technical approaches are described herein relating to various embodiments that are adapted for improving connection flows by using a packet monitor/packet monitoring device.

These packet monitoring/modification solutions are adapted to improve overall throughput by modifying characteristics of the data communication. The devices may be configured to operate at a sending side (e.g., transmission side), a receiving side (e.g., a receiver side), on the communication link controllers (e.g., in-flight), or combinations thereof, in accordance with various embodiments. For example, packet pacing (e.g., packet spacing) may be modified at the sending side (or in-flight), or packets may be spaced by a buffering or intermediary mechanism at the receiver side.

For upstream or downstream devices requesting or receiving the communications, the data packet management activities may be transparent (e.g., a transmission is requested and sent, and the upstream or downstream devices only observe that aspects of the communication were successful and required a particular period of time).

For example, the packet spacing operations can be conducted when the data packets are received at a connection de-bonding device configured to receive the data packets from the set of multi-path network links and to re-generate an original data flow sequence, and/or the packet spacing operations can be conducted when the data packets are transmitted at a connection bonding device configured to allocate the data packets for transmission across the set of multi-path network links based on an original data flow sequence or spacing arrangement.

In a first embodiment, a system for managing data packet delivery flow (e.g., data packet pacing) is described, adapted where data packets are being communicated across a set of multi-path network links. The set of multi-path network links can be bonded together such that they communicate the data packets relating to a particular data communication in concert by operating together. The data packets are spaced from one another during the communication (e.g., transmission), and, in some embodiments, the spacing is provided through the attachment of information to the data packets, such as time-stamps, which modifies how the data packets are handled by a transmitter, an intermediary router, a receiver, or combinations thereof.

A technical challenge with utilizing multi-path network links in this approach is that pacing is difficult to establish and poor pacing results in lost data packets. Lost data packets could result in increased latency that appears for the upper layer protocols. For example, the application layer will see higher latency because the TCP layer needs to retransmit due to the poorly paced packets being dropped.

For some data transfer protocols, poorly paced packets may result in undesired behavior, for example, where the sender must re-transmit packets that are dropped by intermediate routers or other network hops due to large bursts of packets that occur with poor pacing.

The system includes a processor that is configured to monitor an aggregated throughput being provided through the set of multipath network links operating together. For example, there may be three network links, each providing different communication characteristics. A first network link could have a bandwidth of 5 Mbps, a second could have 15 Mbps, and a third could have 30 Mbps, leading to an aggregate of 50 Mbps. The aggregated throughput does not necessarily need to be across all of the set of multipath network links. For example, aggregated throughput can be tracked across a subset, or multiple aggregated throughputs can be monitored across one or more subsets of network links.

Packet pacing is conducted by modifying characteristics of the data packets based at least on the monitored aggregated throughput such that if the one or more data packets are being communicated at a faster rate than the monitored aggregated throughput, the data packets are delayed such that they are/appear to be communicated at a required pace. For example, the characteristics that are modified could be the inter-packet spacing (e.g., relative or absolute) between the receive timestamps of each of the data packets to be based at least on the monitored aggregated throughput (e.g., the required pace being established through an idea inter-packet spacing). Modification of the timestamps can, in some embodiments, include at least one timestamp being corrected to reflect a future timestamp.

Responsive to changes in the monitored aggregated throughput, the processor can be further configured to determine what an ideal sequence of timestamps should have been (e.g., should have been had it known about the changes in monitored aggregate throughput ahead of time) and to correct inter-packet spacing of the timestamps on data packets that have not yet been communicated, such that modified and ideal timestamps align across a duration of time.

In some embodiments, a buffer is used to store the timestamped data packets and is adapted to dynamically increase or decrease in size such that there is no fixed size to define a queue indicative of an order in which data packets are communicated; where a subset of the data packets is periodically removed from the buffer based on a corresponding age (calculated based on the timestamps) of the data packets in the queue. Although such a buffer may have no intended size limit, the expected behaviour is that buffering the burst of packets and metering them out to the destination at a paced rate will indirectly result in the ACK-clocked bursty application transmitting its subsequent packets at the paced rate, so that buffer consumption for the subsequent packets will be much smaller. However, in practical embodiments, an actual buffer limit must be imposed to handle applications that are not ACK-clocked. These applications have a transmission rate irrespective of the pacing rate, so eventually the buffer will reach its limit and packets will need to be dropped according to any number of active queue management (AQM) approaches (e.g., RED, FIFO, CoDel, etc.).

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
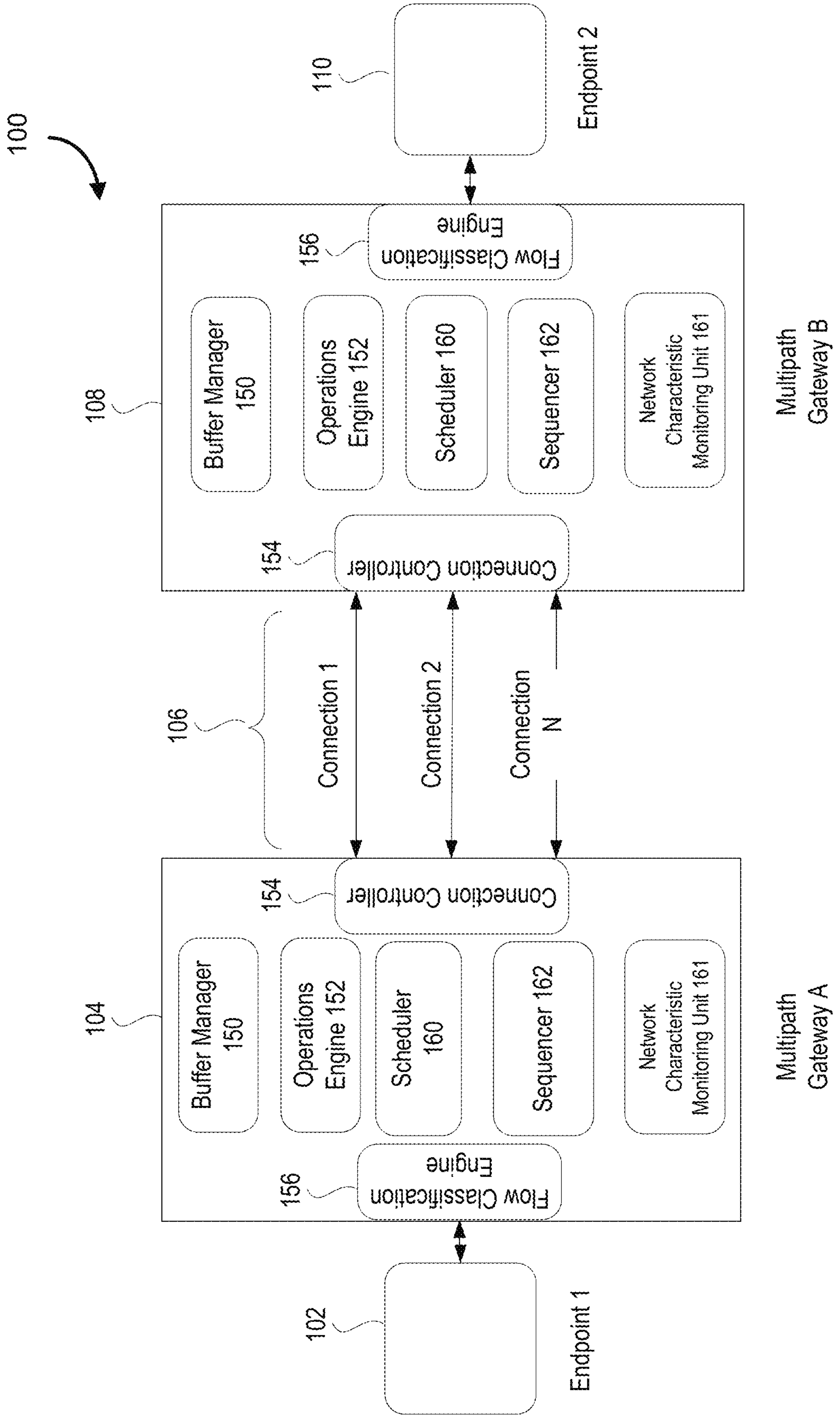
FIG. 1 is a block schematic diagram of an example system for managing data packet delivery flow, according to some embodiments.

Embodiments of the present disclosure generally relate to the field of electronic communications, and more specifically, embodiments relate to devices, systems and methods for managing data packet communications.

In a single communication link scenario, data packet communications protocols can be conducted as a direct negotiation between a sending device and a receiving device. However, where there are multiple communication links being utilized together, for example, as a bonded set of connections, there are increased challenges in relation to data packet buffering and data packet pacing. Multiple communication links being utilized together are particularly useful in scenarios where singular communication pathways are unreliable or do not provide suitable transmissions by themselves.

Example scenarios include scenarios where large video or bulk data transmissions are required (e.g., live-casting at a major sporting event where heavy network traffic is also present), rural communications (e.g., due to geographical distance and spectral interference from geographic features), or in emergency response situations (e.g., where primary communication links are not operable and secondary communication links are required).

Data packet management is beneficial as throughput can be modelled as a function that is inversely correlated to the data packet loss rate (for example, TCP throughput is commonly modeled as inversely proportional to the square root of the loss probability). However, packet management approaches that are utilized between communications across singular links are sub-optimal for multiple communication links being used together.

A technical challenge with utilizing multi-path network links in this approach is that pacing is difficult to establish and poor pacing results in lost data packets. For some data transfer protocols, poorly paced packets may result in undesired behavior, for example, where the sender must retransmit packets that are dropped by intermediate routers or other network hops due to large bursts of packets that occur with poor pacing.

A multi-path networking system that requires buffering and reordering of packets in order to normalize differences in latency, bandwidth, and reliability between its available connections is described, for example, in Applicant's U.S. patent application Ser. No. 16/482,972/PCT Application No. PCT/CA2017/051584, entitled "PACKET TRANSMISSION SYSTEM AND METHOD", incorporated herein by reference in its entirety.

This buffering in combination with ACK-clocked protocols such as TCP can result in bursty transmission of packets. For example, the multi-path system may buffer/delay TCP packets until they are in order, then release them to the destination in a burst. The destination receives the TCP segments in a burst, generates TCP ACKs also in a burst, which arrive at the TCP sender in a burst. An ACK-clocked TCP sender, especially one in a slow start phase, will react to the burst of ACKs by transmitting a burst of new packets of similar size to the acknowledged burst, and an extra burst of new packets of similar size that helps it discover if the network is capable of delivering more data. The overall result is transmission of an even larger burst of packets inflight (twice the size of the just acknowledged burst) in response to the burst of ACKs. This repeats over several cycles and eventually the bursts become so large that the multi-path networking system's buffering limits can be exceeded, causing it to drop some of the TCP segments. The TCP sender incorrectly interprets these drops as congestion and reduces its transmission rate.

The premature drops could be attributed to multi-path system's size-based buffering limits. The limits could be increased to prevent or delay premature drops, however, buffering large bursts of data is only acceptable if the multi-path system's available connections have sufficient transmission capacity to clear the buffer in a reasonable amount of time. If that capacity is not available or is highly variable, accepting large bursts but not clearing them quickly results in excessive buffer bloat, where inflight packets are buffered enroute for a long time, which in turn is seen by the communicating applications as high latency or delivery timeouts.

To address this tradeoff, rather than limiting the buffer by size, limiting it based on sojourn (waiting) time of the packets in the queue is one way to help delay the effects of poor packet pacing. If the multi-path system has a lot of aggregate transmission capacity, the large bursts from poor pacing can still be cleared quickly and no premature drops will occur.

However, this unlimited size, sojourn-time limited queue only delays the inevitable. Continuing with the previous example, eventually the sender will transmit TCP segments in bursts that are so large that the sojourn time of the packets in the multi-path system's buffer will exceed the limit, and they will be dropped, the same as happens with a size-limited queue. For example, assume a network has a drain rate of 8 Mb/s and a buffer with a sojourn time limit of 500 ms. A 1 MB burst of packets buffer by such a network will require 1 second to be drained. Accordingly, some packets at the tail of that burst will exceed the sojourn time limit of 500 ms and will be dropped by the buffer before they get the chance to exit the network. The goal of packet pacing is to induce the application to more evenly space out that 1 MB burst of packets over the 1 second period, so that the multi-path system is not forced to drop the packets from the buffer. Overall system throughput improves (since the application does not see loss occur), and buffer utilization in the multi-path system is also reduced.

As described herein, technical solutions are proposed in relation to technical data packet and data buffer/queue management mechanisms, including physical networking devices (e.g., improved router), network traffic controllers, and corresponding methods and computer program products (e.g., non-transitory computer readable media storing machine-interpretable instructions for execution on a processor) adapted for use with multiple communication links being utilized together. For example, the packet spacing operations of some embodiments are adapted to restore to the data packets a packet communications pace substantially similar to pacing if the data packets were communicated across a single network link. In variant embodiments, different pacing or new pacing can be established as well (e.g., not all embodiments are limited to substantially similar pacing). Pacing can be established through modifications of a routing table or a routing policy, through the injection of delays, the modification of timestamps, etc.

The system, in some embodiments, is adapted to artificially recreate pacing activities that happen naturally in the single connection case. In the multiple connection scenario, there is a level of coordination required, and in some situations, the communications system has some level of control over the pacing of the data packets. However, asserting control over the pacing of the data packets also has computational, component, and device complexity costs that are incurred by imposing the control mechanism.

FIG. 1 is a block schematic diagram of an example system for managing data packet delivery flow, according to some embodiments. Variations are possible and the system can be a suitably configured physical hardware device having various hardware components.

As illustrated in FIG. 1, a system 100 is illustrated that is configured to utilize an improved scheduling approach on the transmitting portion of the system and a buffering system on the receiving end with improved packet spacing as between data packets, establishing a modified packet communication pace.

The components illustrated, in an embodiment, are hardware components that are configured for interoperation with one another. In another embodiment, the components are not discrete components and more than one of the components can be implemented on a particular hardware component (e.g., a computer chip that performs the function of two or more of the components). A processor is configured for execution of machine interpretable instruction sets. In some cases, the system is a special purpose computer that is specifically adapted to correct packet pacing. In some cases, the system is a computer server. In some cases, the system is a configured networking device.

In some embodiments, the components reside on the same platform (e.g., the same printed circuit board), and the system 100 is a singular device that can be transported, connected to a data center/field carry-able device (e.g., a rugged mobile transmitter), etc. In another embodiment, the components are decentralized and may not all be positioned in close proximity, but rather, communicate electronically through telecommunications (e.g., processing and control, rather than being performed locally, are conducted by components residing in a distributed resources environment (e.g., cloud). Components can be provided, for example, in the form of a system on a chip or a chipset for coupling on an integrated circuit or a printed circuit board.

Providing bonded connectivity is particularly desirable in mobile scenarios where signal quality, availability of networks, quality networks, etc. are sub-optimal (e.g., professional news gathering/video creation may take place in locations without strong network infrastructure).

A number of different data connections 106 (e.g., "paths") representing one or more networks (or network channels) is shown, labelled as Connection 1, Connection 2 . . . Connection N. There may be multiple data connections/paths across a single network, or multiple data connections that may use one or more networks.

The system 100 may be configured to communicate to various endpoints 102, 110 or applications, which do not need to have any information about the multiple paths/connections 106 used to request and receive data (e.g., the endpoints 102, 110 can function independently of the paths or connections 106). The received data, for example, can be re-constructed such that the original transmission can be regenerated from the contributions of the different paths/connections 106 (an example use scenario would be the regeneration of video by way of a receiver that is configured to slot into a server rack at a data center facility, integrating with existing broadcast infrastructure to provide improved networking capabilities).

The system 100 receives input (data flows) from a source endpoint 102 and schedules improved delivery of data packets across various connections 106, and then sequences the data packets at the other end of the system 108 prior to transmission to the destination endpoint application 110. In doing so, the system 100 is configured to increase bandwidth to approach the sum of the maximum bandwidth of the various paths available. Compared to using a single connection, the system 100 also provides improved reliability, which can be an important consideration in time-limited, highly sensitive scenarios, such as newsgathering at live events as the events are taking place. At these events, there may be high signal congestion (e.g., sporting event), or unreliability across one or more of the paths (e.g., reporting news after a natural disaster).

In various embodiments, both the scheduler and the sequencer could be provided from a cloud computing implementation, or at an endpoint (prior to the data being consumed by the application at the endpoint), or in various combinations thereof.

The system 100 may be tuned to optimize and or prioritize, performance, best latency, best throughput, least jitter (variation in the latency on a packet flow between two systems), cost of connection, combinations of connections for particular flows, among others (e.g., if the system 100 has information that a transmission (data flow) is of content type X, the system 100 may be configured to only use data connections with similar latency, whereas content type Y may allow a broader mix of data connections (or require greater net capacity which can only be accomplished with a combination of data connections)). This tuning may be provided to the system generally, or specific to each flow (or set of flows based on location, owner of either starting point or endpoint or combination thereof, time of transmission, set of communication links available, security needed for transmission etc.).

The system 100 may be generally bidirectional, in that each gateway 104, 108, will generally have a scheduler and sequencer to handle the TCP traffic (or UDP traffic, or a combination of TCP and UDP traffic, or any type of general IP traffic), though in some embodiments, only one gateway may be required.

A feature of the scheduling portion of the system is a new approach for estimating the bandwidth of a given connection. Estimation, for example, can be based on an improved monitoring approach where redundant (e.g., FEC packets) and non-redundant payloads are distinguished from one another for the purposes of estimation.

The system 100 may be utilized for various scenarios, for example, as a failover or supplement for an existing Internet connection (e.g. a VoIP phone system, or corporate connection to web), whereby additional networks (or paths) are added either to seamlessly replace a dropped primary Internet connection, or bonding is used to only include costlier networks if the primary Internet connection is saturated. Another use is to provide a means of maximizing the usage of a high cost (often sunk cost), high reliability data connections such as satellite, by allowing for the offloading of traffic onto other data connections with different attributes.

In some embodiments, the system is a network gateway configured for routing data flows across a plurality of network connections.

FIG. 1 provides an overview of a system with two gateways 104 and 108, each containing a buffer manager 150, an operations engine 152, a connection controller 154, a flow classification engine 156 (responsible for flow identification and classification), a scheduler 158, a sequencer 160, and a network characteristic monitoring unit 161 and linked by N data connections 106, with each gateway connected to a particular endpoint 102,110. The reference letters A and B are used to distinguish between components of each of the two gateways 104 and 108.

Each gateway 104 and 108 is configured to include a plurality of network interfaces for transmitting data over the plurality of network connections and is a device (e.g., including configured hardware, software, or embedded firmware), including processors configured for: monitoring time-variant network transmission characteristics of the plurality of network connections; parsing at least one packet of a data flow of packets to identify a data flow class for the data flow, wherein the data flow class defines or is otherwise associated with at least one network interface requirement for the data flow; and routing packets in the data flow across the plurality of network connections based on the data flow class, and the time-variant network transmission characteristics.

The buffer manager 150 is configured to set buffers within the gateway that are adapted to more efficiently manage traffic (both individual flows and the combination of multiple simultaneous flows going through the system). In some embodiments, the buffer manager is a discrete processor. In other embodiments, the buffer manager is a computing unit provided by way of a processor that is configured to perform buffer management 150 among other activities.

The operations engine 152 is configured to apply one or more deterministic methods and/or logical operations based on received input data sets (e.g., feedback information, network congestion information, transmission characteristics) to inform the system about constraints that are to be applied to the bonded connection, either per user/client, destination/server, connection (e.g., latency, throughput, cost, jitter, reliability), flow type/requirements (e.g., FTP vs. HTTP vs. streaming video). For instance, the operations engine 152 may be configured to limit certain types of flows to a particular connection or set of data connections based on cost in one instance, but for a different user or flow type, reliability and low latency may be more important. Different conditions, triggers, methods may be utilized depending, for example, on one or more elements of known information. The operations engine 152, for example, may be provided on a same or different processor than buffer manager 150.

The operations engine 152 may be configured to generate, apply, or otherwise manipulate or use one or more rule sets determining logical operations through which routing over the N data connections 106 is controlled.

The flow classification engine 156 is configured to evaluate each data flow received by the multipath gateway 104 for transmission, and is configured to apply a flow classification approach to determine the type of traffic being sent and its requirements, if not already known. In some embodiments, deep packet inspection techniques are adapted to perform the determination. In another embodiment, the evaluation is based on heuristic methods or data flows that have been marked or labelled when generated. In another embodiment, the evaluation is based on rules provided by the user/administrator of the system. In another embodiment, a combination of methods is used. The flow classification engine 156 is configured to interoperate with one or more network interfaces, and may be implemented using electronic circuits or processors.

Flow identification, for example, can be conducted through an analysis of information provided in the packets of a data flow, inspecting packet header information (e.g., source/destination IP, transport protocol, transport protocol port number, DSCP flags). In some situations, the sending device may simply indicate, for example, in a header flag or other metadata, what type of information is in the payload. This can be useful, for example, where the payloads carry encrypted information and it is difficult to ascertain the type of payload that is being sent. In some embodiments, deep packet inspection approaches can also be used (e.g., where it is uncertain what type of information is in the payload).

Differentiated levels of identification may occur, as provided in some embodiments. For example, the contents of the packet body may be further inspected using, for example, deep packet Inspection techniques.

Once a flow has been identified, classification may include categorizing the flow based on its requirements. Example classifications include:

1. Low latency, low-to-medium jitter, packets can be out of order, high bandwidth (live HD video broadcast);
2. Low latency, low-to-medium jitter, packets can be out of order, medium bandwidth (Skype™, FaceTime™), among others (jitter is problematic in real-time communications as it can cause artifacts or degradation of communications);
3. Low latency, low-to-medium jitter, packets can be out of order, low bandwidth (DNS, VoIP);
4. Low latency, no jitter requirement, packets preferred to be in order, low bandwidth (interactive SSH);
5. No latency requirement, no jitter requirement, packets preferred to be in order, medium-to-high bandwidth (e.g., SCP, SFTP, FTP, HTTP); and 6. No latency requirement, no jitter requirement, packets preferred to be in order, no bandwidth requirement, sustained bulk data transfer (e.g., file/system backups), etc.

One or more dimensions over which classification can be conducted on include, but are not limited to:

a. Latency;
b. Bandwidth/throughput;
c. Jitter;
d. Packet ordering; and
e. Volume of data transfer.

As described further below, these classification dimensions are useful in improving efficient communication flow. Latency and bandwidth/throughput considerations are particularly important when there are flows with conflicting requirements. Example embodiments where jitter is handled are described further below, and the system may be configured to accommodate jitter through, for example, buffering at the scheduler, or keeping flows sticky to a particular connection. Packet ordering is described further below, with examples specifically for TCP, and the volume of data is related to where the volume of data can be used as an indicator that can reclassify a flow from one type (low latency, low bandwidth) to another type (latency insensitive, high bandwidth).

Other classification dimensions and classifications are possible, and the above are provided as example classifications. Different dimensions or classifications may be made, and/or combinations therein of the above. For example, in a media broadcast, the system may be configured to classify the video data and metadata associated with the clip (e.g., GPS info, timing info, labels), or the FEC data related to the video stream.

Flow classification can be utilized to remove and/or filter out transmissions that the system is configured to prevent from occurring (e.g., peer-to-peer file sharing in some instances, or material that is known to be under copyright), or traffic that the system may be configured to prefer (e.g., a particular user or software program over another) in the context of providing a tiered service).

For instance, in an internet backup usage scenario, even the bonded backup may be limited in availability, so the system may be configured such that VoIP calls to/from the support organization receive a higher level of service than calls within the organization (where the system could, when under constraint, generate instructions that cause an endpoint to lower the audio quality of some calls over others, or to drop certain calls altogether given the bandwidth constraint).

The scheduler 160 is configured to perform a determination regarding which packets should be sent down which connections 106. The scheduler 160 may be considered as an improved QoS engine. The scheduler 160, in some embodiments, is implemented using one or more processors, or a standalone chip or configured circuit, such as a comparator circuit or an FPGA. The scheduler 160 may include a series of logical gates confirmed for performing the determinations.

While a typical QoS engine manages a single connection—it may be configured to perform flow identification and classification, and the end result is that the QoS engine reorders packets before they are sent out on the one connection.

In contrast, while the scheduler 160 is configured to perform flow identification, classification, and packet reordering, the scheduler 160 of some embodiments is further configured to perform a determination as to which connection to send the packet on in order to give the data flow improved transmission characteristics, and/or meet policies set for the flow by the user/administrator (or set out in various rules). The scheduler 160 may, for example, modify network interface operating characteristics by transmitting sets of control signals to the network interfaces to switch them on or off, or to indicate which should be used to route data. The control signals may be instruction sets indicative of specific characteristics of the desired routing, such as packet timing, reservations of the network interface for particular types of traffic, etc.

For example, 2 connections with the following characteristics are considered:

1) Connection 1: 1 ms round trip time (RTT), 0.5 Mbps estimated bandwidth; and
2) Connection 2: 30 ms RTT, 10 Mbps estimated bandwidth.

The scheduler 160 could try to reserve Connection 1 exclusively for DNS traffic (small packets, low latency). In this example, there may be so much DNS traffic that Connection 1's capacity is reached—the scheduler 160 could be configured to overflow the traffic to Connection 2, but the scheduler 160 could do so selectively based on other determinations or factors. e.g., if scheduler 160 is configured to provide a fair determination, the scheduler 160 could be configured to first overflow traffic from IP addresses that have already sent a significant amount of DNS traffic in the past X seconds.

The scheduler 160 may be configured to process the determinations based, for example, on processes or methods that operate in conjunction with one or more processors or a similar implementation in hardware (e.g., an FPGA). These devices may be configured for operation under control of the operations engine 152, disassembling data streams into data packets and then routing the data packets into buffers (managed by the buffer manager) that feed data packets to the data connections according to rules that seek to optimize packet delivery while taking into account the characteristics of the data connections.

While the primary criteria, in some embodiments, is based on latency and bandwidth, in some embodiments, path maximum transmission unit (PMTU) may also be utilized. For example, if one connection has a PMTU that is significantly smaller than the others (e.g., 500 bytes versus 1500), then it would be designated as a bad candidate for overflow since the packets sent on that connection would need to be fragmented (and may, for example, be avoided or deprioritized).

The scheduler 160, in some embodiments, need not be configured to communicate packets across in the correct order, and rather is configured for communicating the packets across the diverse connections to meet or exceed the desired QoS/QoE metrics (some of which may be defined by a network controller, others which may be defined by a user/customer). Where packets may be communicated out of order, the sequencer 162 and a buffer manager may be utilized to reorder received packets.

A sequential burst of packets is transmitted across a network interface, and based on timestamps recorded when packets in the sequential burst of packets are received at a receiving node, and the size of the packets, a bandwidth estimate of the first network interface is generated. The estimate is then utilized for routing packets in the data flow of sequential packets across a set of network connections based on the generated bandwidth of the first network interface. As described below, in some embodiments, the bandwidth estimate is generated based on the timestamps of packets in the burst which are not coalesced with an initial or a final packet in the burst, and a lower bandwidth value can be estimated and an upper bandwidth value can be estimated (e.g., through substitutions of packets). The packets sent can be test packets, test packets "piggybacking" on data packets, or hybrid packets. Where data packets are used for "piggybacking", some embodiments include flagging such data packets for increased redundancy (e.g., to reinforce a tolerance for lost packets, especially for packets used for bandwidth test purposes).

The sequential packets may be received in order, or within an acceptable deviation from the order such that sequencer 162 is capable of re-arranging the packets for consumption. In some embodiments, sequencer 162 is a physical hardware device that may be incorporated into a broadcasting infrastructure that receives signals and generates an output signal that is a reassembled signal. For example, the physical hardware device may be a rack-mounted appliance that acts as a first stage for signal receipt and re-assembly.

The sequencer 162 is configured to order the received packets and to transmit them to the application at the endpoint in an acceptable order, so as to reduce unnecessary packet re-requests or other error correction for the flow. The order, in some embodiments, is in accordance with the original order. In other embodiments, the order is within an acceptable margin of error such that the receiving endpoint is still able to make use of the data flows. The sequencer 162 may include, for example, a buffer or other mechanism for smoothing out the latency and jitter of the received flow, and in some embodiments, is configured to control the transmission of acknowledgements and storage of the packets based on monitoring of transmission characteristics of the plurality of network connections, and an uneven distribution in the receipt of the data flow of sequential packets.

The sequencer 162 may be provided, for example, on a processor or implemented in hardware (e.g., a field-programmable gate array) that is provided for under control of the operations engine 152, configured to reassemble data flows from received data packets extracted from buffers.

The sequencer 162, on a per-flow basis, is configured to hide differences in latency between the plurality of connections that would be unacceptable to each flow.

The Operations Engine 152 is operable as the aggregator of information provided by the other components (including 154), and directs the sequencer 162 through one or more control signals indicative of how the sequencer 162 should operate on a given flow.

When a system configured for a protocol such as TCP receives packets, the system is generally configured to expect (but does not require) the packets to arrive in order. However, the system is configured to establish a time bound on when it expects out of order packets to arrive (usually some multiple of the round trip time or RTT). The system may also be configured to retransmit missing packets sooner than the time bound based on heuristics (e.g., fast retransmit triggered by three DUP ACKs).

Where packets are arriving at the sequencer 162 on connections with significantly different latencies, the sequencer 162 (on a per flow basis), may be configured to buffer the packets until they are roughly the same age (delay) before sending the packets onward to the destination. For example, it would do this if the flow has requirements for consistent latency and low jitter.

The sequencer 162, does not necessarily need to provide reliable, strictly in-order delivery of data packets, and in some embodiments, is configured to provide what is necessary so that the system using the protocol (e.g., TCP or the application on top of UDP) does not prematurely determine that the packet has been lost by the network.

In some embodiments, the sequencer 162 is configured to monitor (based on data maintained by the operations engine 152) the latency variation (jitter) of each data connection, along with the packet loss, to predict, based on connection reliability, which data connections are likely to delay packets beyond what is expected by the flow (meaning that the endpoints 102 and 110 would consider them lost and invoke their error correction routines).

For an out of order situation, the sequencer 162 may, for example, utilize larger jitter buffers on connections that exhibit larger latency variations. For packet re-transmission, the sequencer 162 may be configured to request lost packets immediately over the "best" (most reliable, lowest latency) connection.

In an example scenario, the bandwidth delay product estimation may not be entirely accurate and a latency spike is experienced at a connection. As a result, packets are received out of order at an intermediary gateway.

In these embodiments, the sequencer 162 may be configured to perform predictive determinations regarding how the protocol (and/or related applications) might behave with respect to mis-ordered packets, and generate instructions reordering packets such that a downstream system is less likely to incorrectly assume that the network has reached capacity (and thus pull back on its transmission rate), and/or unnecessarily request retransmission of packets that have not been lost.

For example, many TCP implementations use a number of (e.g., three) consecutive duplicate acknowledgements (DUP ACKs) as a hint that the packet subsequent to the DUP ACK is likely lost. These acknowledgements can be tracked, for example, by a packet monitoring mechanism. In this example, if a receiver receives packets 1, 2, 4, 5, 6, it will send ACK (2) three times (once for each of packets 4/5/6). The sender then is configured to recognize that this event may hint that packet 3 is likely lost in the network, and pre-emptively retransmits it before any normal retransmission time-out (RTO) timers expire.

In some embodiments, the sequencer 162, may be configured to account for such predictive determinations. As per the above example, if the sequencer 162 has packets 1, 2, 4, 5, 6, 3 buffered, the sequencer 162 may then reorder the packets to ensure that the packets are transmitted in their proper order. However, if the packets were already buffered in the order of 1, 2, 4, 3, 5, 6, the sequencer 162 might be configured not to bother reordering them before transmission as the predictive determination would not be triggered in this example (given the positioning of packet 3).

The connection controller 154 is configured to perform the actual routing between the different connection paths 106, and is provided, for example, to indicate that the connections 106 to the bonded links need not reside on the physical gateway 104, 108 (e.g., a physical gateway may have some link (Ethernet or otherwise) to physical transmitting/receiving devices or satellite equipment that may be elsewhere (and may be in different places re: antennae and the like)). Accordingly, the endpoints are logically connected, and can be physically separated in a variety of ways.

In an embodiment, the system 100 is configured to provide what is known as TCP acceleration, wherein the gateway creates a pre-buffer upon receiving a packet, and will provide an acknowledgment signal (e.g., ACK flag) to the sending endpoint as though the receiving endpoint had already received the packet, allowing the sending endpoint 102 to send more packets into the system 100 prior to the actual packet being delivered to the endpoint. In some embodiments, prebuffering is used for TCP acceleration (opportunistic acknowledging (ACKing), combined with buffering the resulting data).

This prebuffer could exist prior to the first link to the sending endpoint 102, or anywhere else in the chain to the endpoint 110. The size of this prebuffer may vary, depending on feedback from the multipath network, which, in some embodiments, is an estimate or measurement of the bandwidth delay product, or based on a set of predetermined logical operations (wherein certain applications or users receive pre-buffers with certain characteristics of speed, latency, throughput, etc.).

The prebuffer may, for example, exist at various points within an implementation, for example, the prebuffer could exist at the entry point to the gateway 104, or anywhere down the line to 110 (though prior to the final destination). In an embodiment, there are a series of prebuffers, for example, a prebuffer on both Gateway A and Gateway B as data flows from Endpoint 1 to Endpoint 2.

Data accepted into a prebuffer and opportunistically ACKed to endpoint 102 becomes the responsibility of the system 100 to reliably transmit to endpoint 110. The ACK tells the original endpoint 102 that the endpoint 110 has received the data, so it no longer needs to handle retransmission through its normal TCP mechanisms.

Prebuffering and opportunistic ACKing are advantageous because it removes the time limit that system 100 has available to handle loss and other non-ideal behaviours of the connections 106. The time limit without TCP acceleration is based on the TCP RTO calculated by endpoint 102, which is a value not in the control of the system 100. If this time limit is exceeded, endpoint 102: a) Retransmits data that system 100 may already be buffering; and b) Reduces its cwnd, thus reducing throughput.

The sizes of prebuffers may need to be limited in order to place a bound on memory usage, necessitating communication of flow control information between multipath gateways 104 and 108. For example, if the communication link between gateway 108 and endpoint 110 has lower throughput than the aggregate throughput of all connections 106, the amount of data buffered at 108 will continually increase.

If the amount buffered exceeds the limit, a flow control message is sent to 104, to tell it to temporarily stop opportunistically ACKing data sent from endpoint 102.

When the amount buffered eventually drops below the limit, a flow control message is sent to 104 to tell it to resume opportunistically ACKing. Limits may be static thresholds, or for example, determined/calculated dynamically taking into account factors such as the aggregate BDP of all connections 106, and the total number of data flows currently being handled by the system. Thresholds at which the flow control start/stop messages are sent do not have to be the same (e.g., there can be hysteresis).

Similarly, there may be flow control signalling information within a multipath gateway itself. For example, if the aggregate throughput of connections 106 is smaller than the throughput between endpoint 102 and gateway 104, the prebuffers inside 104 will continually increase. After exceeding the limits (which may be calculated as previously described), opportunistic ACKing of data coming from endpoint 102 may need to be temporarily stopped, then resumed when the amount of data drops below the appropriate threshold.

The previous examples describe TCP acceleration for data being sent from endpoint 102 to 110. The same descriptions apply for data being sent in the opposite direction.

In another embodiment, a buffer manager is configured to provide overbuffering on the outgoing transmission per communication link to account for variability in the behaviour of the connection networks and for potentially "bursty" nature of other activity on the network, and of the source transmission.

Overbuffering may be directed to, for example, intentionally accepting more packets on the input side than the BDP of the connections on the output side are able to handle. A difference between "overbuffering" and "buffering" is that the buffer manager may buffer different amounts based on flow requirements, and based on how the connection BDP changes in real time.

This overbuffering would cause the gateway 104 accept and buffer more data from the transmitting endpoint 102 than it would otherwise be prepared to accommodate (e.g., more than it is "comfortable with"). Overbuffering could be conducted either overall (e.g., the system is configured to take more than the system estimates is available in aggregate throughput), or could be moved into the connection controller and managed per connection, or provided in a combination of both (e.g., multiple over-buffers per transmission).

For example, even though the system 100 might only estimate that it can send 20 Mbps across a given set of links, it may accept more than that (say 30 Mbps) from the transmitting endpoint 102 for a time, buffering what it can't immediately send, based on a determination that the network conditions may change possibly based on statistical, historical knowledge of the network characteristics provided by the network characteristic monitoring unit 161, or that there may be a time when the transmitting endpoint 102 (or other incoming or outgoing transmissions) may slow down its data transmission rate.

The flow classification engine 156, in some embodiments, is configured to flag certain types of traffic and the operations engine 152 may, in some embodiments, be configured to instruct the buffer manager to size and manage pre and/or over buffering on a per flow basis, selecting the sizes of the buffers based on any number of criteria (data type, user, historical data on behaviour, requirements of the flow).

In some embodiments, the size of these buffers are determined per transmission, and also per gateway (since there may be many transmissions being routed through the gateway at one time). In one embodiment, the prebuffering and overbuffering techniques are utilized in tandem.

In some embodiments, the size of overbuffering is determined to be substantially proportional to the bandwidth delay product (BDP). For example, the system may be configured such that if the network has a high BDP (e.g., 10 Mbps @ 400 ms=>500 KB), the buffer should be larger so that there is always have enough data available to keep the network/pipeline filled with packets. Conversely, with low BDP networks, the system may be configured such that there is less buffering, so as to not introduce excessive buffer bloat.

Buffer bloat may refer, for example, to excess buffering inside a network, resulting in high latency and reduced throughput. Given the advent of cheaper and more readily available memory, many devices now utilize excessive buffers, without consideration to the impact of such buffers. Buffer bloat is described in more details in papers published by the Association for Computing Machinery, including, for example, a Dec. 7, 2011 paper entitled: "BufferBloat: What's Wrong with the Internet?", and a Nov. 29, 2011 paper entitled: "Bufferbloat: Dark Buffers in the Internet", both incorporated herein by reference.

As an example of determining overbuffering size in relation to bitrate and latency, a rule may be implemented in relation to a requirement that the system should not add more than 50% to the base latency of the network due to overbuffering. In this example, the rule indicating that overbuffering size would be Bitrate*BaseLatency*1.5. Other rules are possible.

In one embodiment, the operations engine 152 may be contained in the multipath gateway 104, 108. In another embodiment, the operations engine 152 may reside in the cloud and apply to one or more gateways 104, 108. In one embodiment, there may be multiple endpoints 102, 110 connecting to a single multipath gateway 104, 108. In an embodiment, the endpoint 102, 110 and multipath gateway 104, 108 may be present on the same device.

In an embodiment, the connection controller 154 may be distinct from the multipath gateway 104, 108 (and physically associated with one or more connection devices (e.g., a wireless interface, or a wired connection)). In another embodiment, the connection controller may reside on the gateway, but the physical connections (e.g., interface or wired connection) may reside on a separate unit, device, or devices.

While the endpoints need to be logically connected, they may be connected such that they are connection 106 agnostic (e.g., communications handled by the multipath gateways 104, 108). In some embodiments, the set of connections 106 available to a given gateway could be dynamic (e.g., a particular network only available at certain times, or to certain users).

In one embodiment, the traffic coming from the endpoint 102 may be controllable by the system 100 (e.g., the system may be configured to alter the bitrate of a video transmission originating at the endpoint) based on dynamic feedback from the system 100. In another embodiment, the traffic coming from the endpoint 102 may not be controllable by the system 100 (e.g., a web request originating from the endpoint).

Figure 13:
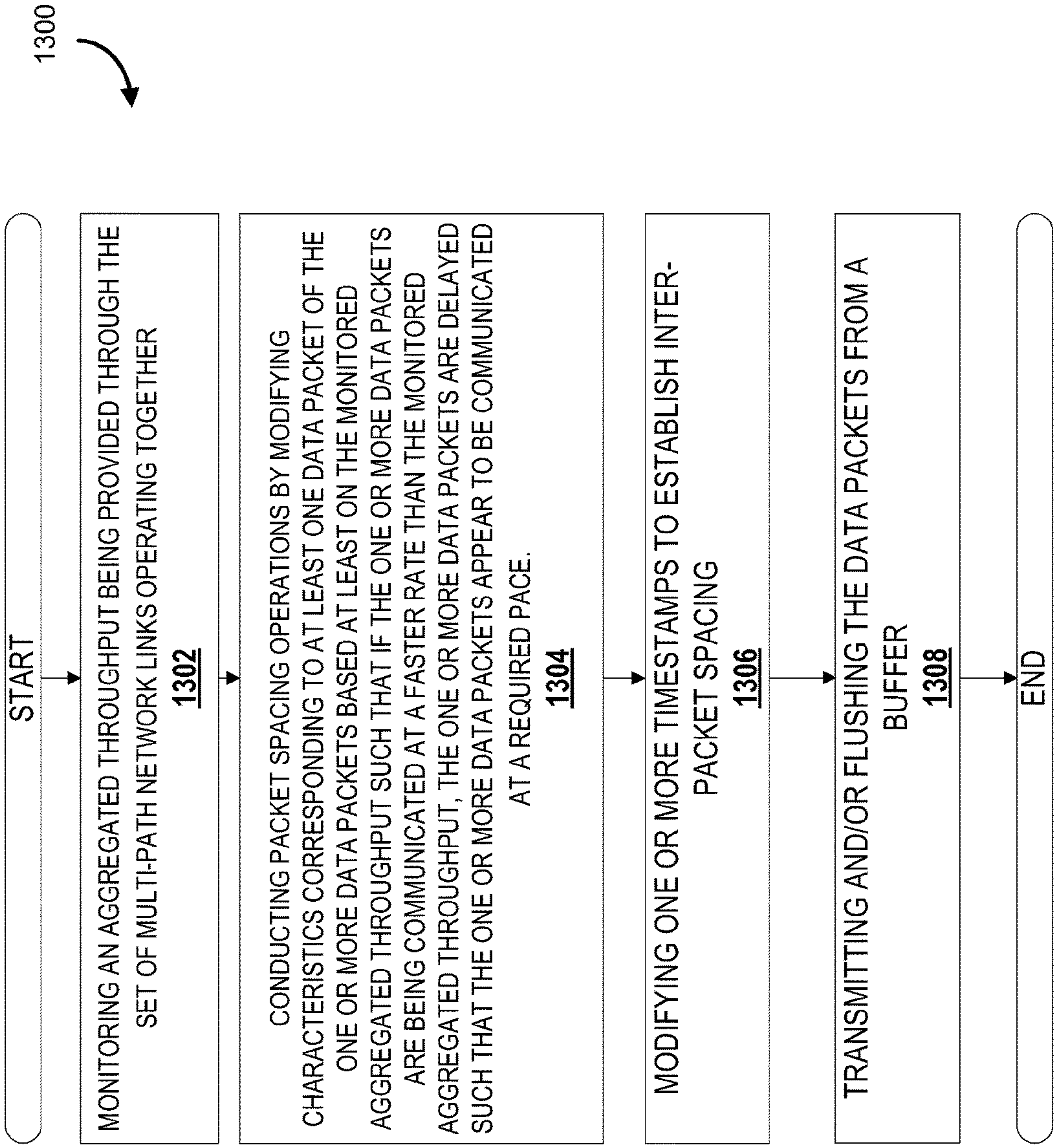
FIG. 13 is a process diagram, illustrative of a method for managing data packet delivery flow, according to some embodiments.

In another embodiment, there may be more than one set of multipath gateways 104, 108, in a transmission chain (for example, FIG. 13). For example, there may be, in some implementations, a TCP transmission with a remote multipath gateway connecting to a gateway in the cloud, with the transmission then providing a non-multipath connection to another multipath gateway on the edge of the cloud, with a transmission then to another multipath remote gateway.

Various use cases may be possible, including military use cases, where a remote field operator may have a need to transmit a large volume of data to another remote location. The operator's system 100 may be set up with a transmission mechanism where multiple paths are utilized to provide the data to the broader Internet. The system 100 would then use a high capacity backhaul to transmit to somewhere else on the edge of the Internet, where it then requires another multipath transmission in order to get to the second remote endpoint.

In an embodiment, Gateway A 104 and B 108 may be configured to send control information between each other via one of the connection paths available.

These solutions are adapted to improve overall throughput by modifying characteristics of the data communication, and are not limited only to the example shown in FIG. 1. For example, the devices may be configured to operate at a sending side (e.g., transmission side), a receiving side (e.g., a receiver side), on the communication link controllers (e.g., in-flight), or combinations thereof, in accordance with various embodiments.

For example, inter-packet spacing may be modified at the sending side (or in-flight) by communicating metadata to the receiver in the form of timestamps for each packet that reflect the desired pacing rate. The receiver could then make transmission decisions for each of the packets based on the timestamps.

For upstream or downstream devices requesting or receiving the communications, the data packet management activities may be transparent (e.g., a transmission is requested and sent, and the upstream or downstream devices only observe that aspects of the communication was successful and required a particular period of time).

For example, the packet spacing operations can be conducted when the data packets are received at a connection de-bonding device configured to receive the data packets from the set of multi-path network links and to re-generate an original data flow sequence, and/or the packet spacing operations can be conducted when the data packets are transmitted at a connection bonding device configured to allocate the data packets for transmission across the set of multi-path network links based on an original data flow sequence.

In a first embodiment, a system for managing data packet delivery flow is described, adapted where data packets are being communicated across a set of multi-path network links. The set of multi-path network links can be bonded together such that they communicate the data packets relating to a particular data communication in concert by operating together.

The system includes a processor that is configured to monitor an aggregated throughput being provided through the set of multi-path network links operating together. For example, there may be three network links, each providing different communication characteristics. A first network link could have a bandwidth of 5 Mbps, a second could have 15 Mbps, and a third could have 30 Mbps, leading to an aggregate of 50 Mbps.

Packet pacing is conducted by modifying characteristics of the data packets based at least on the monitored aggregated throughput such that if the one or more data packets are being communicated at a faster rate than the monitored aggregated throughput, the characteristics are modified such that the one or more data packets appear to be communicated at a required pace. For example, the characteristics that are modified could be the timestamps in the metadata corresponding to each of the data packets that are received by the multi-path sender. Modification of the timestamps can, in some embodiments, include at least one timestamp being corrected to reflect a future timestamp.

The processor can be further configured to monitor the different types of packets being transmitted on each of the multi-path network links. For example, data payload packets that the sender is attempting to communicate to the receiver are one type of packet that should contribute to the monitored aggregate throughput. Test packets that the sender can use to evaluate the network properties of the network links are a type of overhead packet that should not contribute. Retransmit packets that are duplicates of previously transmitted data packets sent in response to loss reports or pre-emptively to guard against possible or predicted loss are a type of redundancy packet that should also not contribute. A plurality of other types of packets can exist. At a given point in time, a mix of all these types of packets can be in-flight simultaneously over one or more of the multi-path network links. Accordingly, the monitored aggregated throughput can be adjusted to reflect the portion being used by the data packets specifically (non-overhead and non-redundancy packets).

In one embodiment, the processor can perform accounting/packet characteristic determination functions, for example, packet counting or byte counting, and averaging the result over a sliding window period to determine the portion of the monitored aggregated throughput that data packets are consuming. Continuing the previous example, if the third network link with a total throughput of 30 Mbps was transmitting 20 Mbps of data packets (e.g. 20 Mb in the previous 1 second), 6 Mbps of test packets (e.g. 6 Mb in the same 1 second), and 4 Mbps of retransmit packets (e.g. 4 Mb in the same 1 second), only the 20 Mbps portion would be considered when conducting pacing for data packets. The monitored aggregated throughput for pacing purposes would be adjusted to 40 Mbps in this example. These can be tracked, for example, by a packet monitor.

In other embodiments, converting inflight byte counts to a bitrate is based on the total estimated bitrate and total congestion window (CWND) of the connection. For example, a connection with a total estimated bitrate of 30 Mbps, a total CWND of 500 KB, and inflight data packets of 100 KB, would have a contribution to the aggregate of $$30\text{ Mbps} * \frac{100\text{ KB in flight}}{500\text{ KB } CWND} = 6\text{ Mbps}.$$

Responsive to changes in the monitored aggregated throughput, the processor can be further configured to determine what an ideal sequence of timestamps should have been (e.g., should have been had it known about the changes in monitored aggregate throughput ahead of time) and to correct inter-packet spacing of the timestamps on data packets that have not yet been communicated, such that modified and ideal timestamps align across a duration of time. Changes in the monitored aggregated throughput result when changes in the network links are detected or measured, for example when feedback is received from the debonder, or when the mix of in-flight packets changes, for example when previously sent packets are acknowledged and other packets of possibly different types are sent accordingly.

In some embodiments, a buffer for data packets, the buffer adapted to dynamically increase or decrease in size such that there is no fixed size to define a queue indicative of an order in which data packets are communicated; where a subset of the data packets is periodically removed from the buffer based on a corresponding age (e.g., sojourn time) of the data packets in the queue. The sojourn time can be determined by comparing timestamps.

Figure 2:
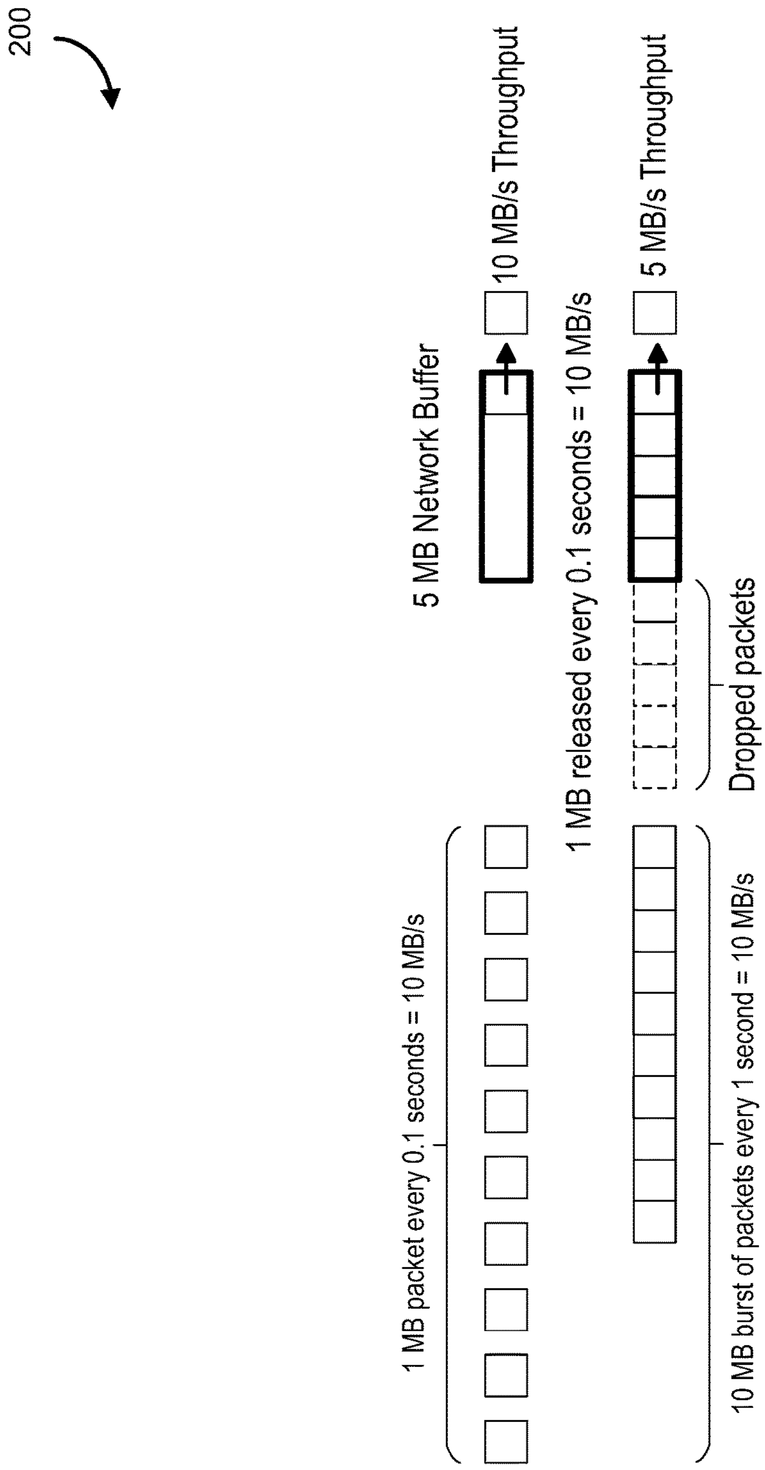
FIG. 2 is a packet pacing diagram showing packets in relation to data buffers, according to some embodiments.

FIG. 2 is a packet pacing diagram 200 showing packets in relation to data buffers.

The diagram 200 illustrates how a well-paced sender can achieve a higher throughput than a bursty sender through the same network. The figure shows two senders, one well-paced, the other bursty. Both senders are transmitting 1 MB packets at a rate of 10 MB/s, and their packets are traversing through a bottleneck link that has a maximum buffer size of 5 MB and a drain rate of 10 MB/s.

The well-paced sender transmits a 1 MB packet every 100 milliseconds. When those packets arrive at the bottleneck link, they briefly sojourn in the 5 MB network buffer, then are immediately drained at the bottleneck rate. The average throughput achieved by this sender is the full 10 MB/s.

The bursty sender transmits ten 1 MB packets every second. The first five packets of every burst are queued into the bottleneck link's 5 MB buffer and the second five packets are dropped since the buffer is full. The bottleneck link subsequently drains its buffer at a rate of 10 MB/s, meaning a 1 MB packet every 100 milliseconds. For every 1 second of time, the bottleneck link is active for the first 500 ms, but it is idle for the second 500 ms since there are no packets to transmit (they were dropped). The average throughput achieved by this bursty sender is 5 MB/s.

The TCP congestion control algorithms (e.g., Reno, CUBIC) are ACK-clocked. This means that they do not transmit packets at a specific bitrate, but instead maintain the concept of a congestion window (cwnd).

As long as the number of bytes inflight (unacknowledged by the receiver) is less than cwnd, they will transmit as quickly as possible (assuming new bytes are available for transmit). Once inflight equals cwnd, the sender stops transmitting. They only resume when acknowledgements (ACKs) for inflight bytes are received. Therefore, the bitrate and burstiness of transmission is governed entirely by the rate at which ACKs arrive.

For the purpose of the following explanations, assume that the TCP sender is never application limited. This means that every time that the TCP sender wishes to transmit bytes because inflight is less than cwnd, there are bytes available. Also assume that the TCP sender is not receiver window (rwin) limited—meaning the TCP receiver always advertises that it can accept at least as many bytes as cwnd minus inflight.

Figure 3:
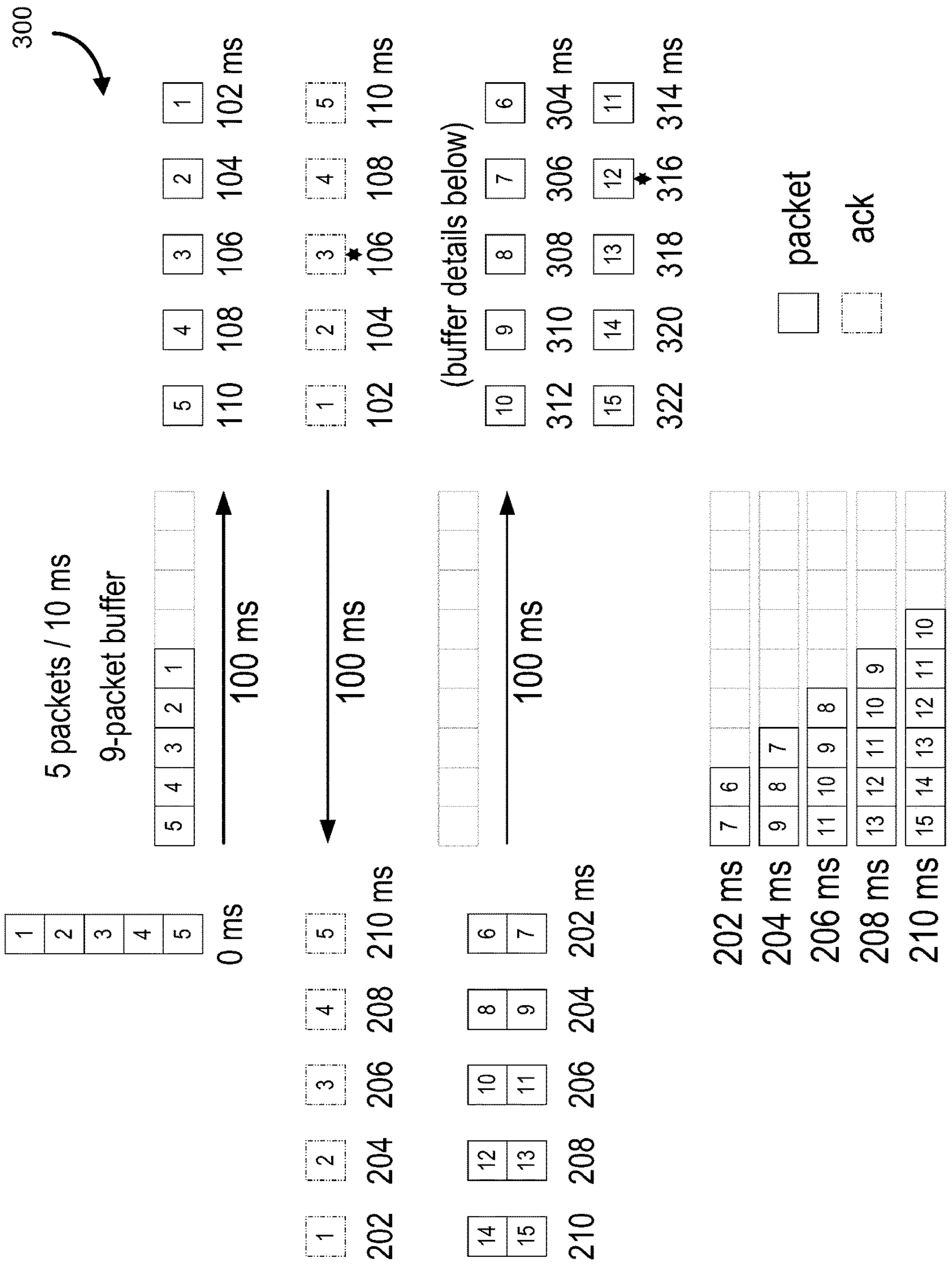
FIG. 3 is a packet pacing diagram showing an example for a single connection, according to some embodiments.

FIG. 3 is a diagram 300 that illustrates how the bottleneck link of a single-path connection is able to naturally pace the packets for ACK-clocked protocols such as TCP Reno and CUBIC.

The cwnd for a new TCP flow starts at a low, reasonable value (referred to as the initial cwnd). In the figure, this is shown at time t=0 ms—the initial cwnd for this sender is 5 packets. Since inflight equals 0 initially, the sender transmits a burst of packets equal to the initial cwnd. As these packets traverse the network (which in this figure has a total one-way latency of 100 ms), each hop is only capable of transmitting the bytes at its bottleneck rate (the bitrate it is physically capable of sustaining).

Eventually the packets arrive at a hop that is the bottleneck. In this example, the bottleneck has a buffer size of 9-packets, and a drain rate of 5 packets every 10 ms (i.e., 2 ms inter-packet spacing). This bottleneck 'naturally' spaces out the packets in time, such that when they arrive at the receiver, the 5 packets have inter-packet spacing that reflects the bottleneck rate (they arrive at t=102, 104, 106, 108, and 110 ms). The packets have taken on the natural pacing of the bottleneck link, 5 packets/10 ms.

The TCP receiver generates ACKs as the packets arrive, so the ACKs are transmitted at the same pace (leaving at t=102, 104, 106, 108, and 110 ms). The ACKs arrive back at the TCP sender at the same pace (arriving at t=202, 204, 206, 208, and 210 ms), causing inflight to decrease at the same pace.

As a result, subsequent transmission by the TCP sender to bring inflight back up toward cwnd naturally occurs at the bottleneck rate rather than in bursts as it did during the first transmission at t=0 when inflight was initially 0.

For each ACK received by the TCP sender, in addition to decreasing inflight, it can also result in an increase to cwnd. The rate and magnitude of increase depends on the congestion control algorithm and its internal state. In this example, the sender is using TCP Reno and is in the "slow start" phase. As such, cwnd is increased by the same number of packets that are ACKed.

This results in "paced bursts"—for each packet ACKed, inflight decreases by 1 and cwnd increases by 1, allowing the TCP sender to transmit 2 packets in the next burst. These smaller bursts will again be "spaced out" (paced) by the bottleneck link according to the mechanism described above. For example, packets 6 and 7 are the first "paced burst" of 2 packets transmitted at t=202 ms, but they arrive at the receiver spaced out by the bottleneck rate of 1 packet/2 ms. So they arrive at t=304 ms and t=306 ms.

This cycle causes the TCP sender to increase its rate of transmission. When the TCP sender reaches a bitrate higher than that of the throughput of the bottleneck link, the rate at which it transmits packets into the bottleneck buffer exceeds the rate at which the bottleneck drains the buffer, causing the buffer to fill. Eventually the buffer becomes full, resulting in dropped packets that signal the TCP flow to pull back (reduce cwnd).

The TCP flow will repeatedly try to increase its throughput in a similar fashion at later times. The throughput of the TCP flow therefore fluctuates around the throughput of the bottleneck link.

Figure 4A:
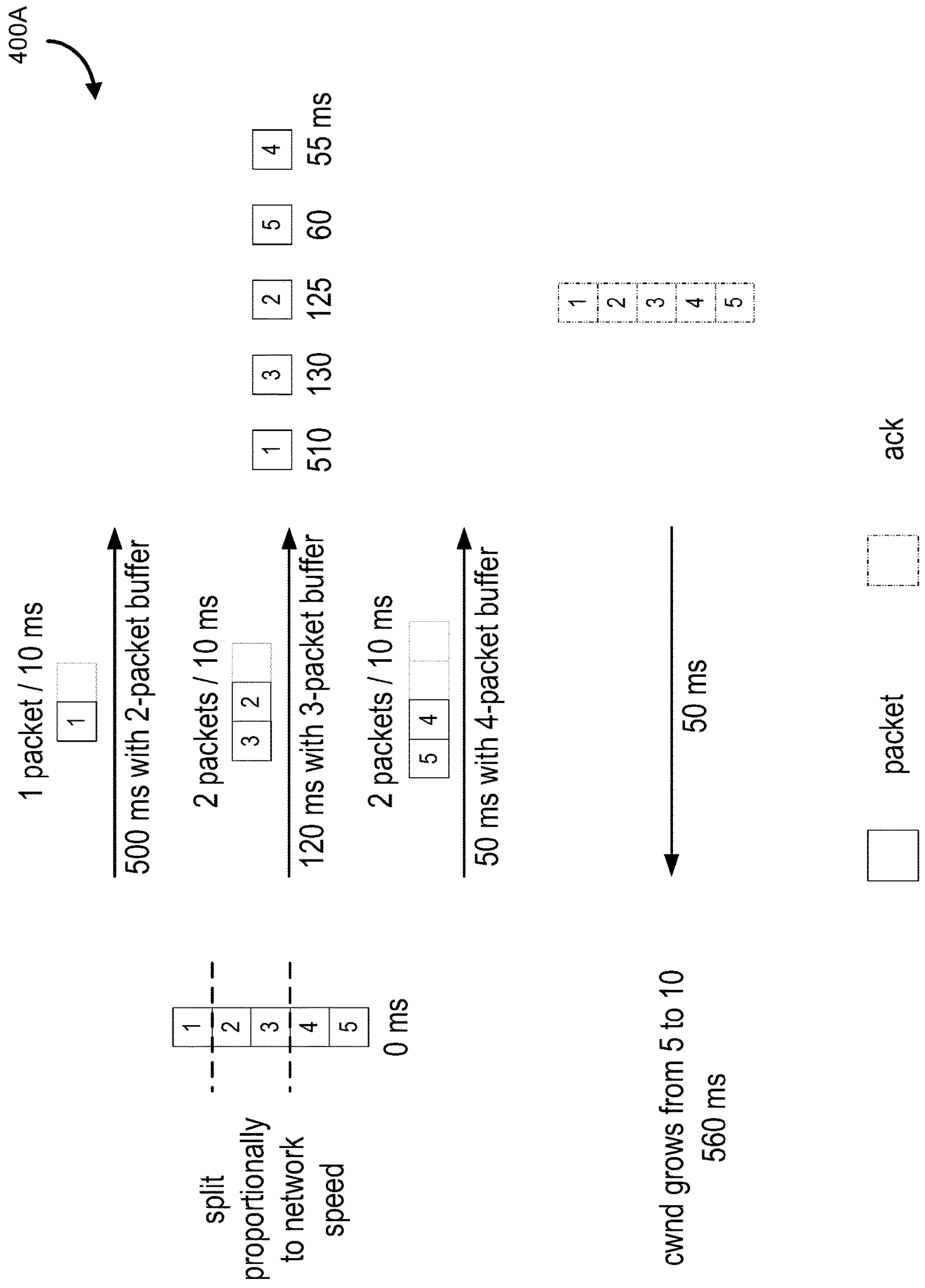
FIG. 4A is a diagram showing an example for multiple connections without pacing, according to some embodiments

FIG. 4A is a diagram 400A that illustrates what happens when a TCP Reno or CUBIC flow traverses a naïve multipath bonding system 100 that does not explicitly account for pacing. The system has three paths:

500 ms latency, 1 packet/10 ms drain rate, 2 packet buffer
120 ms latency, 2 packets/10 ms drain rate, 3 packet buffer
50 ms latency, 2 packets/10 ms drain rate, 4 packet buffer As before, the initial inflight is 0 packets, and the initial cwnd is 5 packets, so the TCP sender transmits a burst of 5 packets at time t=0 ms. The example multipath bonding system splits the packets proportionally to the drain rates of the paths, meaning 1 packet over the first connection, and 2 packets each on the other connections.

Since each connection has a different throughput and latency, sequencer 162 must buffer and reorder the packets before releasing them to the destination TCP receiver. In this example, packet number 1 arrives at sequencer 162 last, at time t=510 ms, at which point all 5 packets are flushed to the destination TCP receiver. This behaviour removes the 'natural' pacing previously described in the non-multipath scenario.

The burst of packets seen by the TCP receiver with the naive sequencer 162, will generate a burst of ACKs. In this example, the multipath system sends the ACKs on the fastest link, so they all arrive at the TCP sender as a burst at time t=560. As in the previous example, the TCP sender is in "slow start" phase, so at this time the cwnd opens up to 10 packets.

Figure 4B:
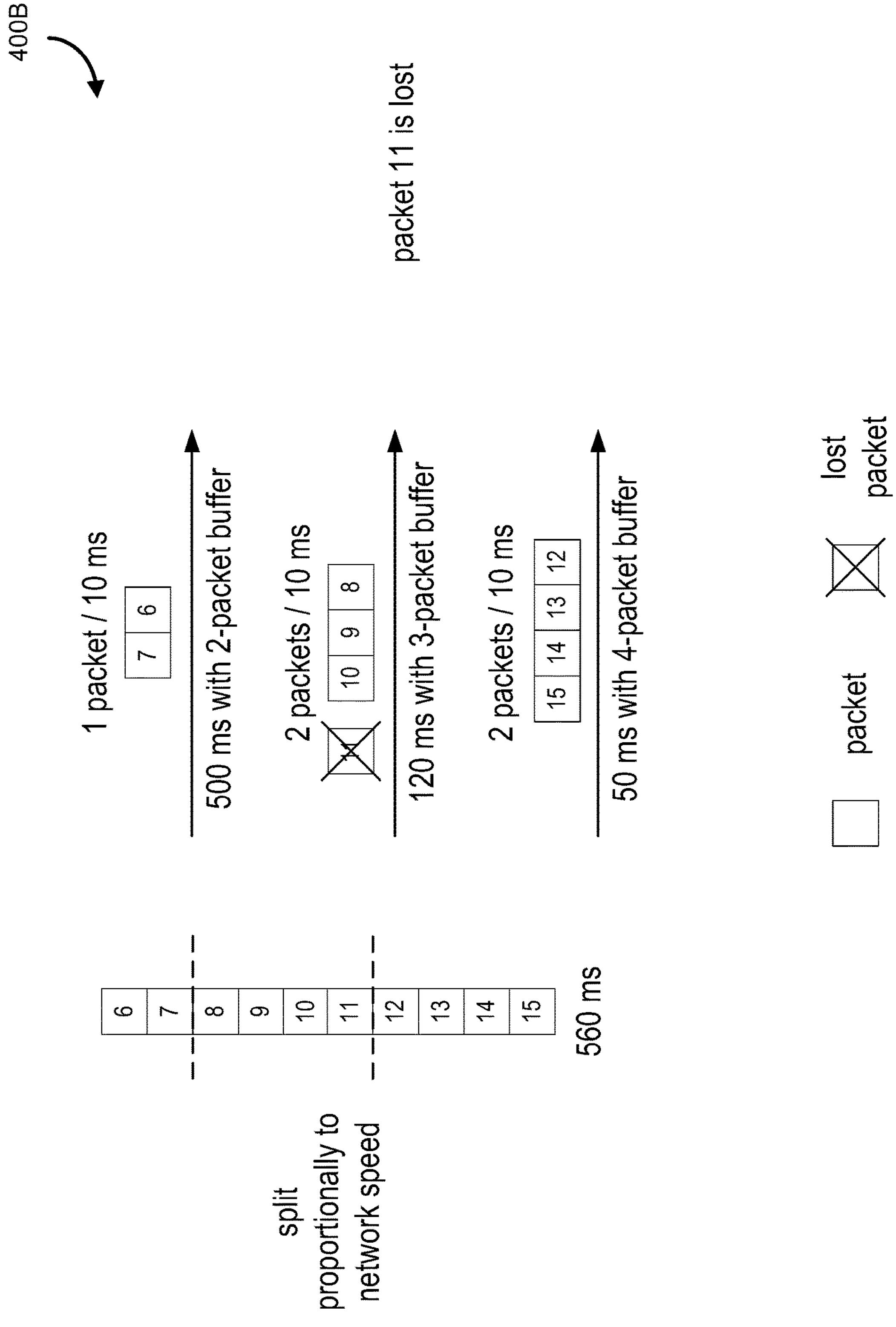
FIG. 4B is a diagram showing an example for multiple connections when loss occurs without pacing, according to some embodiments

FIG. 4B is a diagram 400B that illustrates what happens next—since inflight is now 0 and cwnd is 10, the TCP sender transmits 10 packets in a burst through the multi-path system. It again splits the 10 packets among the paths proportional to their bandwidth. However, recall that the second connection only has 3 buffer slots, insufficient for the 4 packets to be transmitted. As such, packet number 11 is dropped.

The TCP sender interprets these drops as congestion and immediately takes action to resolve this perceived congestion by limiting the cwnd, for example, by halving its value. Note however that this perceived congestion is a false positive caused by the lack of pacing. The premature reduction of the cwnd thereby reduces the transmission rate, and the application running over this TCP connection experiences reduced throughput. Note that this example shows the multi-path connections dropping packets due to a fixed size buffer, but the multi-path system itself could also be the source of drops. For a different mix of connection speeds, it is possible for the input buffer of the multi-path system, even one that drops based on packet sojourn time rather than buffer size, to drop packets if the TCP sender burst size becomes large enough.

To avoid the negative side effects of packet bursts on TCP throughput, it is essential for the bonding system 100 to restore pacing to the packets. Various approaches are proposed in the upcoming paragraphs.

The bonded connections should appear to the TCP flow as a single connection. Accordingly, in the bonded connection case, the packets must exhibit pacing similar to the pacing that would be observed had the packets been transmitted on a single connection with a throughput equal to the aggregate throughput of the bonded connections.

Figure 5A:
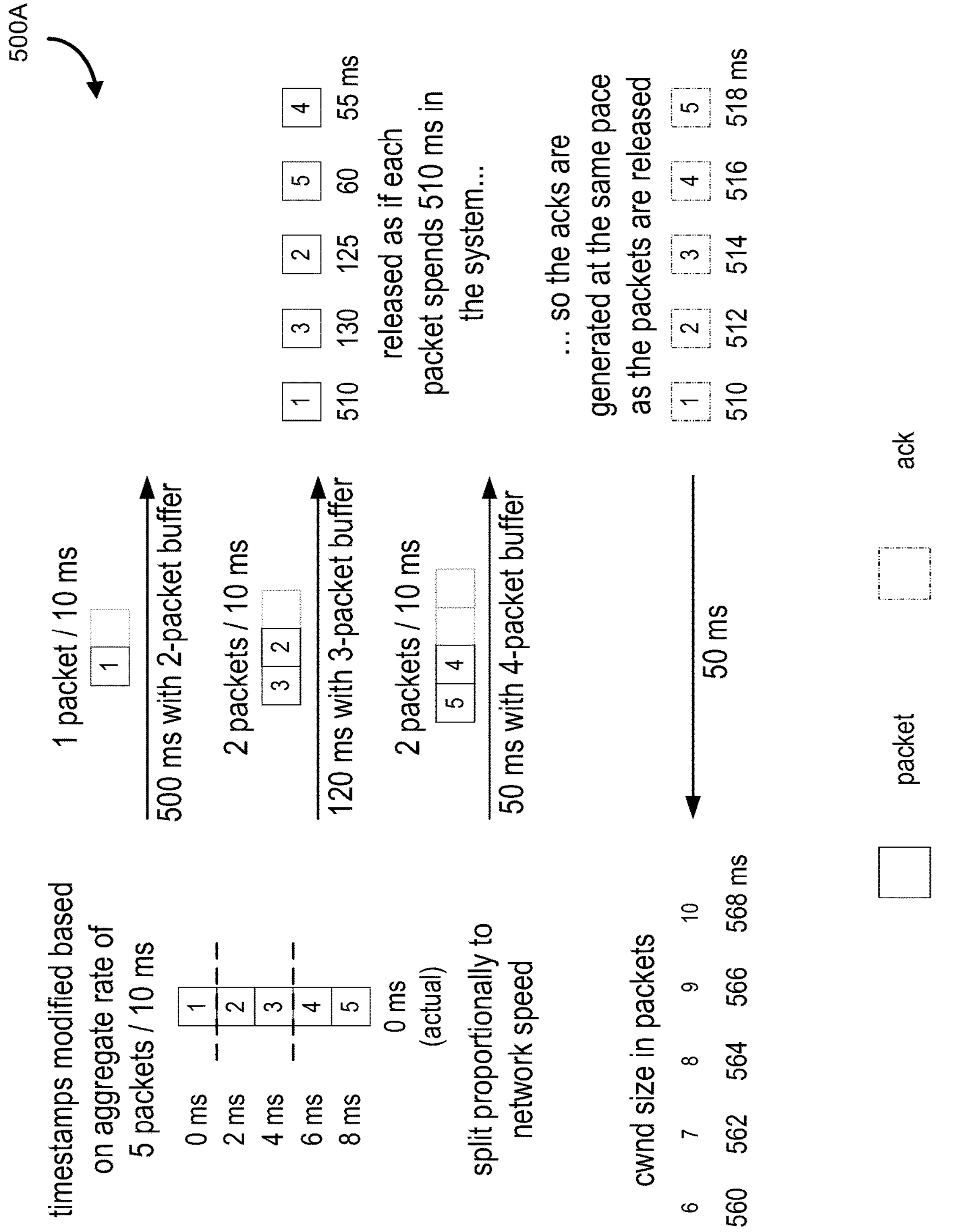
FIG. 5A is a diagram showing an example for multiple connections with pacing, according to some embodiments.

FIG. 5A is a diagram 500A that illustrates a multipath system that restores pacing to the original packets. As before, packet number 1 is the last to arrive at sequencer 162, but this time, rather than flush all 5 packets at once, it restores the pacing by delaying each packet, making it appear as if they had all been delayed by the latency of the worst connection (510 ms) and were transmitted at the aggregate rate of all connections (5 packets/10 ms), meaning an inter-packet spacing of 2 ms.

In one embodiment, the implementation of these delays is accomplished through the sender and receiver using metadata in the form of timestamps on the packets. The timestamps can be, but do not necessarily have to be from synchronized clocks between the sender and receiver. For the purposes of the example FIG. 5A, the clocks are synchronized.

The multi-path sender marks the 5 TCP data segments with timestamps of 0, 2, 4, 6, and 8 ms. At the multi-path receiver, as these packets are received and placed in the buffer, their current age can always be calculated by subtracting their timestamp from the current time. In this example, the multi-path receiver holds (delays) each TCP segment in its buffer until each one has spent 510 ms in the system. This means that the multi-path receiver only transmits them to the TCP receiver endpoint when their ages have reached 510, 512, 514, 516, and 518 ms (respectively).

As a result, the TCP ACKs are generated and sent by the TCP receiver at the same pacing rate and consequently arrive back at the TCP sender (through the multi-path system) with the same 2 ms inter-packet spacing. They then reduce inflight at a rate of 1 packet every 2 ms, and increase cwnd at a rate of 1 packet every 2 ms.

Figure 5B:
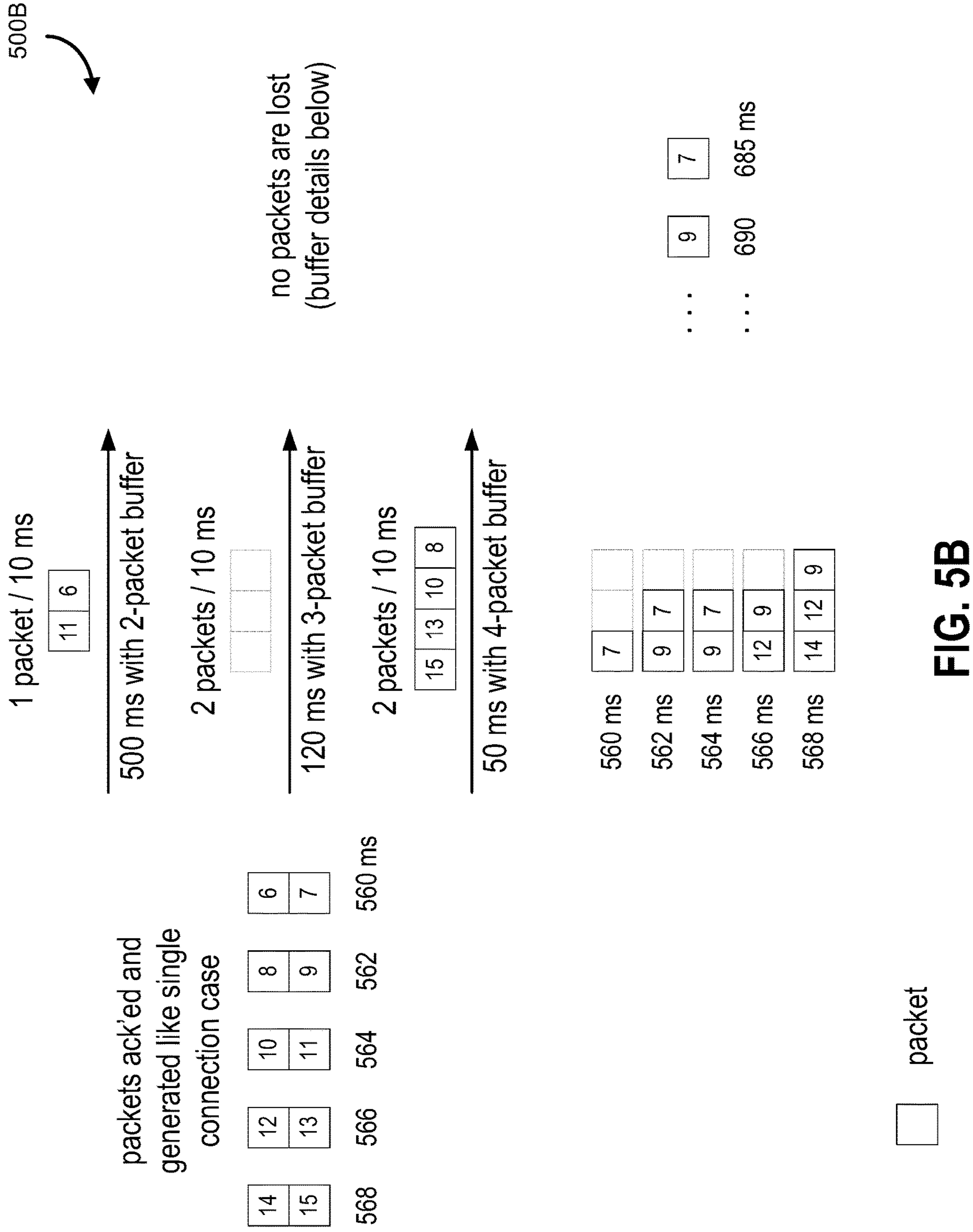
FIG. 5B is a diagram showing an example for multiple connections with pacing and no loss occurring, according to some embodiments.

FIG. 5B is a diagram 500B that illustrates how the well paced ACKs now result in well paced bursts, similar to the single path example of FIG. 3. The timeline of events is as follows:

ACK arrives at t=560 ms, reducing inflight by 1 and increasing cwnd by 1, allowing two packets to be transmitted.

Packet numbers 6 and 7 are transmitted, split over the available paths proportional to their transmission rates—packet 6 on the first path, packet 7 on the second path.

ACK arrives at t=562 ms, allowing another two packets to be transmitted.

Packet numbers 8 and 9 are transmitted, proportionally split over the available paths—packet 8 on the third path, packet 9 on the second path. The first path is skipped since it proportionally has half the capacity of the other two paths.

The process repeats, and this time unlike FIG. 4B, the second path's buffer size limit is never hit, so no packets are dropped. As a result, the TCP sender does not see congestion at this point, so does not prematurely reduce the cwnd and accordingly does not prematurely pull back on its transmission rate. The TCP sender continues to increment its cwnd, eventually settles on a correct larger value that truly reflects the full aggregate capability of the bonded networks, and thereby achieves a higher overall throughput.

In other embodiments, this is achieved on the receiving side within sequencer 162, based on the aggregate throughput of the bonded connections being communicated directly or indirectly from the sender to the receiving side.

In one embodiment, the monitored aggregate throughput is directly communicated from the sender to the receiver over an independent control channel.

In another embodiment, the sender communicates the missing pieces of information to the receiver, which would then run the same algorithm as the sender to indirectly determine the aggregate throughput. The missing information may be smaller in size than the value of the aggregate throughput. This alternate approach could save on network usage and delay, but require more complexity and computer processing capabilities on the receiver. One example of such an approach is described in the IETF draft draft-cheng-iccrg-delivery-rate-estimation-00, incorporated here in its entirety by reference. It determines the throughput of a network link by calculating the delivery rate, i.e., the number of bytes delivered from the sender to the receiver in a certain period of time. Three pieces of information are required to calculate the delivery rate accurately:

1) The number of bytes delivered to the receiver;
2) The time period over which these bytes were delivered; and
3) Whether bytes were available at the sender for every transmission event, otherwise, the link was not fully utilized (referred to as "application limited"), and the calculated delivery rate is lower than the actual throughput of the link.

The first two pieces of information are determined by the receiver as it receives packets. Given any 2 packet reception events, the number of bytes delivered to the receiver is the total size in bytes of all packets received between these 2 events, excluding the packets of the first event and including the packets of the last event. The time period over which these bytes were delivered is the difference in time between when these 2 events happened.

The third piece of information, however, cannot be independently determined at the receiver, because it is purely related to a sender event. This missing piece of information can be represented with 1 bit. For example, a bit value of 0 indicates the sender did not have bytes available at every transmission event (i.e. throughput estimate might be inaccurate) and a bit value of 1 indicates that the sender did have bytes available at every transmission event (i.e. throughput estimate is accurate), Given that 1 bit is the minimum amount of information that can be communicated over a network link, any alternative approach to communicate the throughput estimate directly would consume at least an equal or greater amount of bits.

Once the receiver has a value for the aggregate bandwidth, it could drain the sequencer 162 buffer using an external mechanism. For example, some network interfaces can be configured at the hardware or driver level to release packets at a certain bit rate. The debonder can configure the network interface to which it writes packets to release them at the aggregate throughput. In another embodiment, the receiver can use the size of the packets and the aggregate throughput to release the packets at the correct time to achieve the required pacing.

In another embodiment, a multi-path sender could take advantage of the properties of the connections it has available in order to obtain natural pacing. For example, packets belonging to a particular TCP flow may be transmitted only on a subset of the available connections. If the properties of those connections are the same (or the subset only contains one connection), pacing will occur naturally without explicit communication or other intentional actions by the sender or receiver.

In another embodiment, the packet pacing can also be restored by modifying the packets in the scheduler 160 on the sending side. This approach has the advantage of not requiring communication of the aggregate bonded throughput to the debonder at the receiving side. The flow classification engine 156 stamps packets from the sending side with metadata including the time they are received from the endpoint 102. Accordingly, the packets received in a single burst all get stamped with the same timestamp.

As previously described, the sequencer 162 at the debonder buffers, reorders, and holds packets before release in order to reduce jitter and re-ordering. It does this by comparing the age of the packet relative to the metadata timestamp. Accordingly, in an embodiment without pacing, the packets received in a single burst at flow classification engine 156 are eventually all released at the same time by sequencer 162. Packet pacing can be achieved if the scheduler 160 at the bonder modifies the timestamps on the packets, such that the sequencer 162 at the debonder releases them at different times that reflect the required pacing.

In one embodiment, the mechanism used by scheduler 160 is to compare the timestamps of incoming packets with the aggregate throughput of the bonded connections. If the inter-packet spacing indicates that packets are being received at a faster rate than the aggregate throughput, their timestamps are corrected such that they appear to have been received at the required pace. Note that these corrections can push the timestamps into the future.

This is exactly what was described in FIG. 5A—packets 1 through 5 were all received at t=0, which is an inter-packet spacing of 0 ms. The actual aggregate throughput in that example is 5 packets/10 ms, which is an inter-packet spacing of 2 ms. Scheduler 160 adjusts the timestamps on the packets such that $Packet_1$=0 ms, $Packet_2$=2 ms, $Packet_3$=4 ms, $Packet_4$=6 ms, and $Packet_5$=8 ms. Packets 2 through 5 all have timestamps in the future. This adjustment can, for example, take place by modifying the metadata associated with each packet at the sender, which includes the timestamps being adjusted. The adjustment can also happen in the overhead fields that encapsulate the packet. These fields are used by the sequencer 162 to deliver the packets to the receiving endpoint at the correct time.

A subsequent change in aggregate throughput might imply that some of the previously corrected timestamps used from the future should have been different. Those timestamps can no longer be modified if the packets are inflight (already sent). In such a case, the algorithm determines what the ideal sequence of timestamps should have been. The result is taken into consideration when correcting the inter-packet spacing of timestamps on packets that are not yet inflight, such that the modified and ideal timestamps eventually align.

Figure 6:
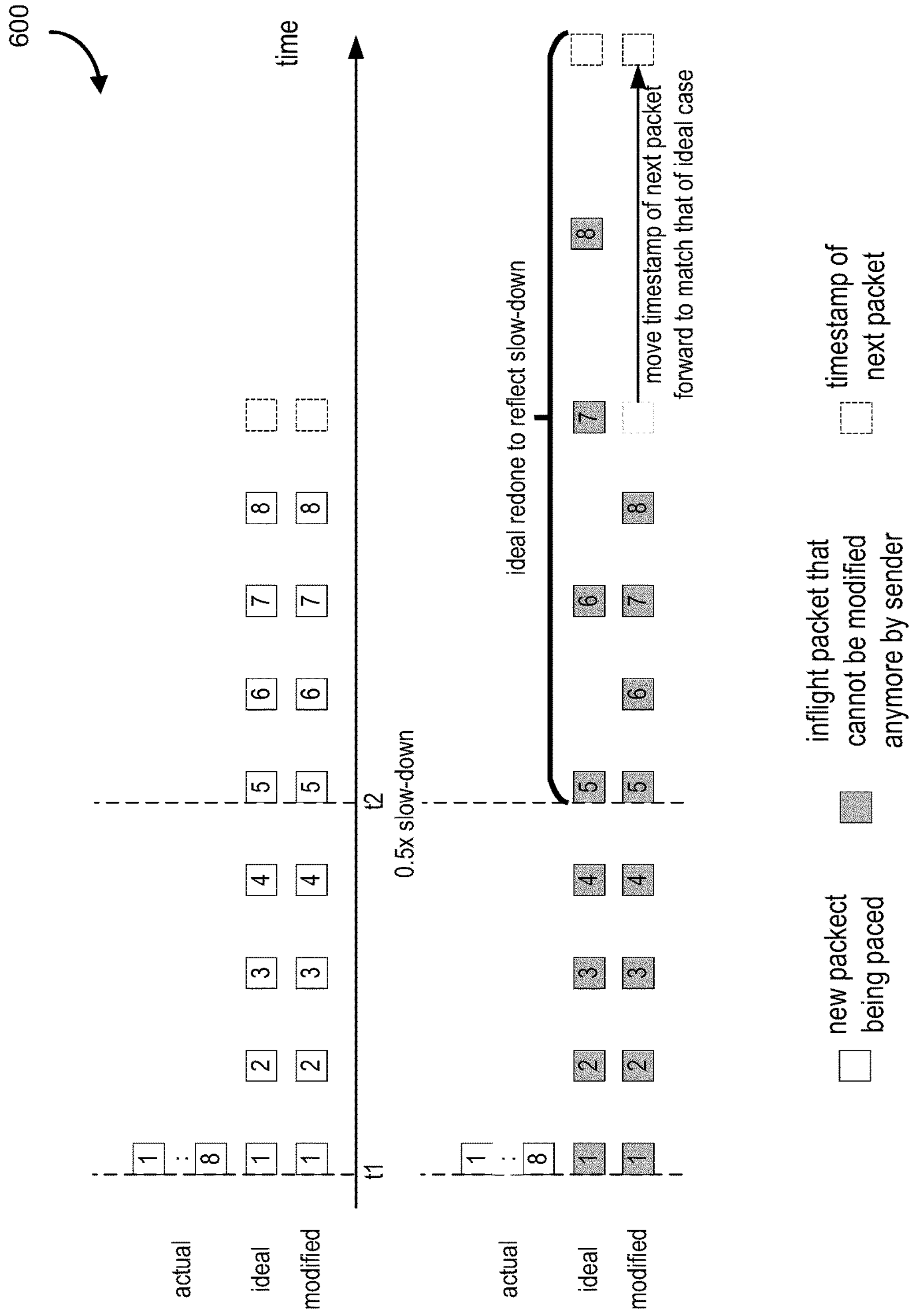
FIG. 6 is a packet pacing diagram showing ideal vs modified timestamp adjustments when aggregate bandwidth decreases, according to some embodiments.

FIG. 6 is a diagram 600 that illustrates an example of how the approach can operate when the aggregate throughput decreases, for example, when one of the contributing network interfaces is powered down, or when a contributing cellular interface provides less throughput because the number of users of the cellular service provider increased. At time t1, 8 packets arrive at flow classification engine 156. Scheduler 160 adjusts the inter-packet spacing of their timestamps to reflect the aggregate bandwidth at t1, and the packets are transmitted (they are inflight). The ideal and modified timestamps are equal at this point.

Sometime later at t2 (which coincides with the timestamp of inflight packet 5), the aggregate bandwidth decreases by 50%. Packets 5 through 8 are inflight and their timestamps cannot be modified to reflect the new slower aggregate bandwidth. However, an ideal set of timestamps can be determined/calculated, simulating as if packets 5 through 8 were spaced according to the new slower aggregate bandwidth (slower bandwidth means inter-packet spacing increases, pushing the packets further into the future).

Any packets that are not yet inflight will have their timestamps corrected by scheduler 160 such that they start after the ideal future timestamp that packet 8 should have received if it was possible to correct it. In this way, the average pacing rate will match the newly detected value at time t2.

Figure 7A:
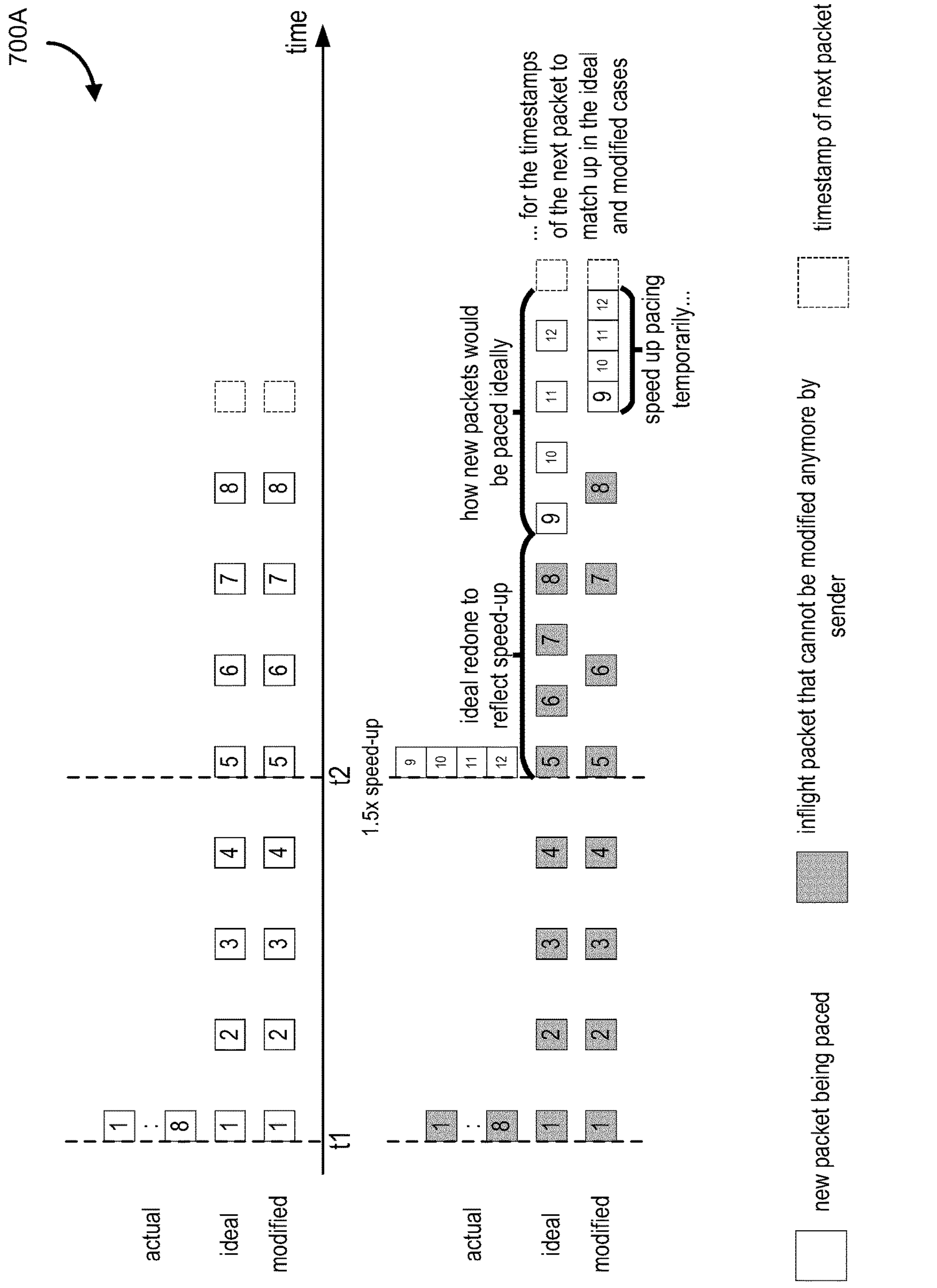
FIG. 7A is a packet pacing diagram showing ideal vs modified timestamp adjustments when aggregate bandwidth increases, according to some embodiments.

FIG. 7A is a diagram 700A that shows an example of how the approach operates when the aggregate throughput increases. Packets 1 through 8 are received by flow classification engine 156 at time t1, and the inter-packet spacing of their timestamps are corrected by scheduler 160 such that they match the aggregate bandwidth at t1, and the packets are transmitted (they are inflight). The ideal and modified timestamps are equal at this point.

At time t2 (which coincides with the timestamp of inflight packet 5), the aggregate bandwidth increases by 50%. Packets 5 through 8 are inflight and their timestamps cannot be modified to reflect the new increase in bandwidth. However, an ideal set of timestamps can be calculated, simulating as if packets 5 through 8 were spaced according to the new higher aggregate bandwidth (higher bandwidth means inter-packet spacing decreases, bringing the ideal timestamps back from the future, closer to the present).

At time t2, packets 9 through 12 are also received by flow classification engine 156. Scheduler 160 determines the inter-packet spacing of these packets relative to the new ideal timestamps of inflight packets 5 through 8, in order to determine the target ideal timestamp for packet 12. However, since the actual timestamps of inflight packets 5 through 8 cannot be changed, packets 9 through 12 must be assigned modified timestamps somewhere between the actual timestamp of packet 8 and the ideal timestamp of packet 12. One embodiment spaces the timestamps evenly between those two time points. The ideal and modified timestamps are equal after this operation, allowing subsequent packets (13+) to be paced relative to the ideal timestamp.

Figure 7B:
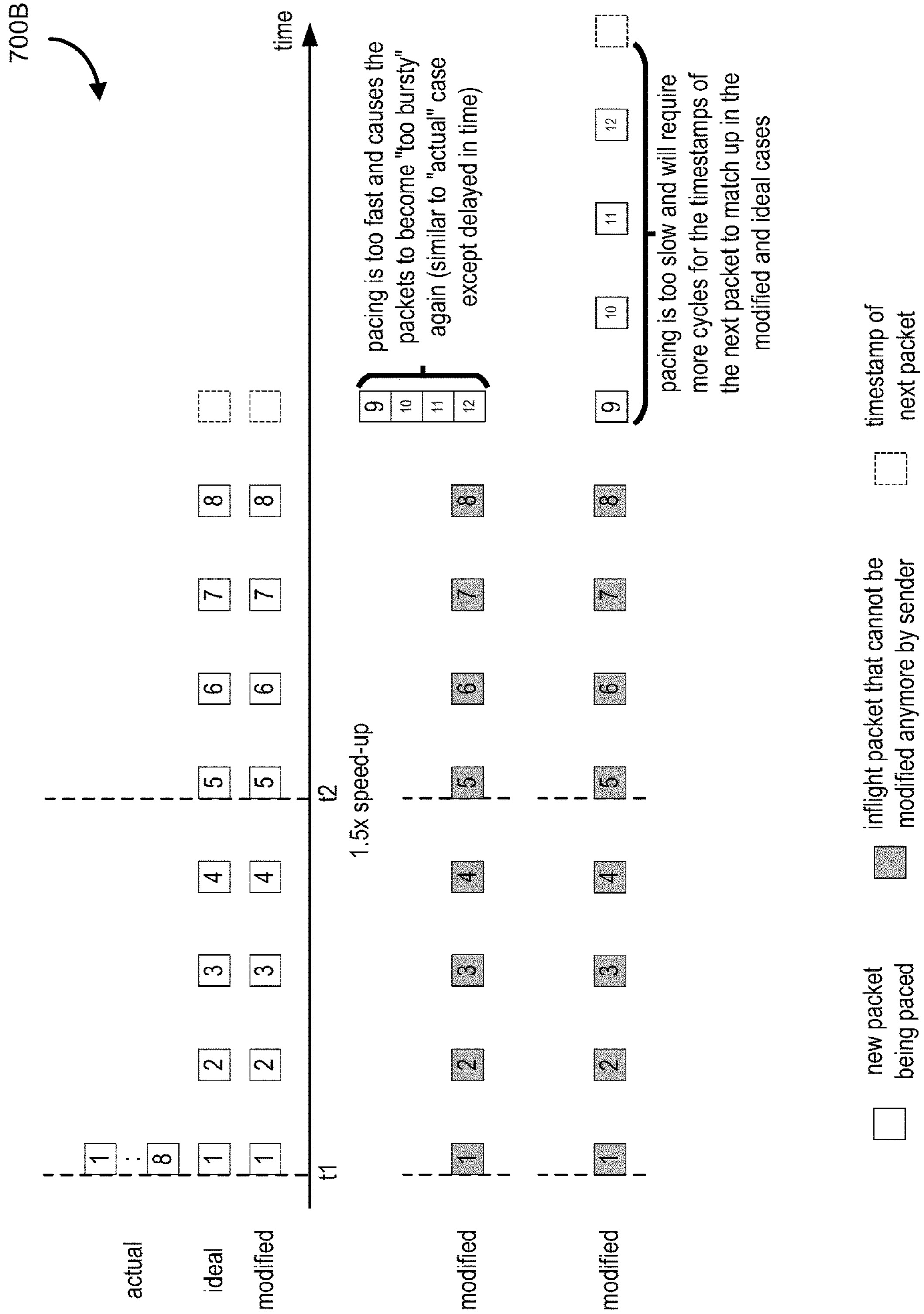
FIG. 7B is a packet pacing diagram showing the effect of adjusting modified timestamps too quickly or slowly when aggregate bandwidth increases, according to some embodiments.

Some embodiments do not necessarily correct the modified timestamps to target the ideal case for future packets. As can be seen in diagram 700B on FIG. 7B, the modified case may result in excessive bursting (which is the original problem that this approach is trying to avoid), since it may force the timestamps of the packets to have very small (or even no) inter-packet spacing.

Since the goal is to reduce bursting, a floor on the minimum acceptable inter-packet spacing may be enforced, causing the timestamps on the current burst of packets to move beyond the ideal point (and again into the future).

As long as the floor is smaller than the ideal inter-packet spacing for the current aggregate throughput, the modified timestamps on the packets will eventually match up with the ideal point (e.g., "catching up") as more packets are paced and sent.

In some embodiments, the floor on the minimum acceptable inter-packet spacing is a parameter that can be configured or determined based on input such as administrator preference or application requirements. The tradeoff that occurs with this parameter is that upon an increase in aggregate bandwidth, a smaller floor allows the increased aggregate bandwidth to be used sooner, at the expense of short term bursting of packets (which may cause packet loss for ACK-clocked protocols, as previously discussed).

In some embodiments, sequencer 162 can be configured for how it should treat late or lost packets. For example, In FIG. 5A, if packet 1 never makes it to the debonder, the point at which it decides to flush packets 2 through 5 to the destination can take into account administrative preference, application/protocol requirements, statistical analysis of connection behaviour, etc. For example, if the receiving application has no use for packets that are delivered to it later than 1 second after these packets were generated by the sending application, the sequencer 162 should flush (i.e. deliver) packets 2 to 5 to it before the 1 second deadline is reached, even if packet 1 is still missing or a retransmission of packet 1 has not arrived yet. In other words, it is better that the application receives 4 out of 5 packets in a reasonable timeframe, rather than possibly receiving all 5 packets when it is too late and they are no longer useful. The important thing to note is that the inter-packet spacing for packets 2 through 5 does not change as a result of this process—the corrected pacing is preserved; all the packets are just offset in time by the same amount.

If packet 1 eventually does arrive, the decision of whether to forward it to the destination late, or drop it can also take into account administrative preference, application/protocol requirements, statistical analysis of connection behaviour, etc. If the decision is to forward the late packet onto the destination, its pacing will not be preserved, since the packets that were sequentially before and after it were already transmitted to the destination. In some embodiments, pacing of late packets could be taken into account by sequencer 162—for example, further delaying the transmission of late packets in order to prevent excessive bursting. In yet another embodiment, the multi-path sender and receiver could work together to achieve the desired pacing. For example, the scheduler 160 could alter the inter-packet spacing by modifying the timestamps in the packet metadata to reflect the current desired pacing rate, as previously described for FIGS. 6, 7A, and 7B. If the pacing rate subsequently changes, scheduler 160 could continue to alter the inter-packet spacing pretending that the timestamps on the inflight packets were somehow corrected. In the case where the aggregate bandwidth increases, this would result in sequential packets having non-monotonic timestamps (i.e., timestamps that appear to go back in time). The correction of the non-monotonic timestamps could occur at sequencer 162 before flushing the packets to the destination.

Figure 8:
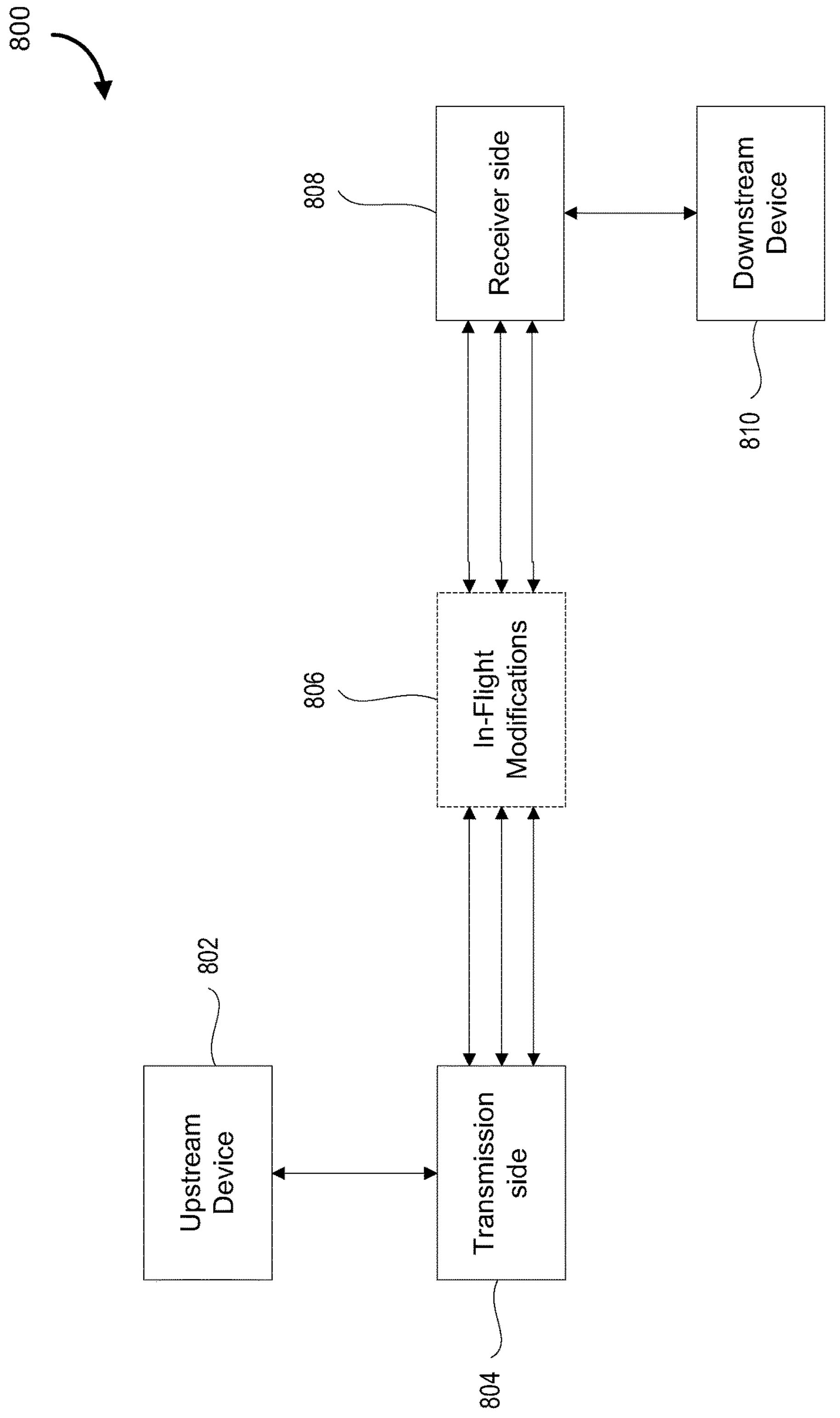
FIG. 8 is a block diagram showing components of an example in flight modification system, according to some embodiments.

FIG. 8 is a block diagram showing components of an example system 800, according to some embodiments. In this example, the upstream device 802 is communicating with the downstream device 810. The communications can be uni-directional (e.g., one of the upstream device 802 and downstream device 810 operates as a transmitter device and the opposite operates as a receiver device), or bi-directional, where both the upstream device 802 and downstream device 810 operate as transmitters and receivers to communicate data packets.

In the simplified example of the diagram 800 of FIG. 8, the multi-path gateway mechanisms 804 and 808 denoted as transmission side 804 and receiver side 808, with potential inflight modifications at 806 (shown in dashed lines). As described in various embodiments herein, one or more of the denoted as transmission side 804 and receiver side 808, with potential inflight modifications at 806 (shown in dashed lines) can be used to conduct (e.g., or enforce) data packet delivery flow modification mechanisms (e.g., protocols).

A set of bonded connections (whose membership may be dynamic as new connections become available/feasible and/or existing connections become unavailable/infeasible) are evaluated to establish an overall throughput or other aggregate communications characteristics, which is then communicated to at least one of transmission side 804 and receiver side 808, or inflight modifications device 806, such that data packet pacing/spacing can be modified.

In particular, the characteristics corresponding to data packets being transmitted (or in-flight, or buffered at a receiver) can be modified based at least on the monitored aggregated throughput if the data packets are being communicated at a faster rate than the monitored aggregated throughput or other aggregate communications characteristics.

Figure 9:
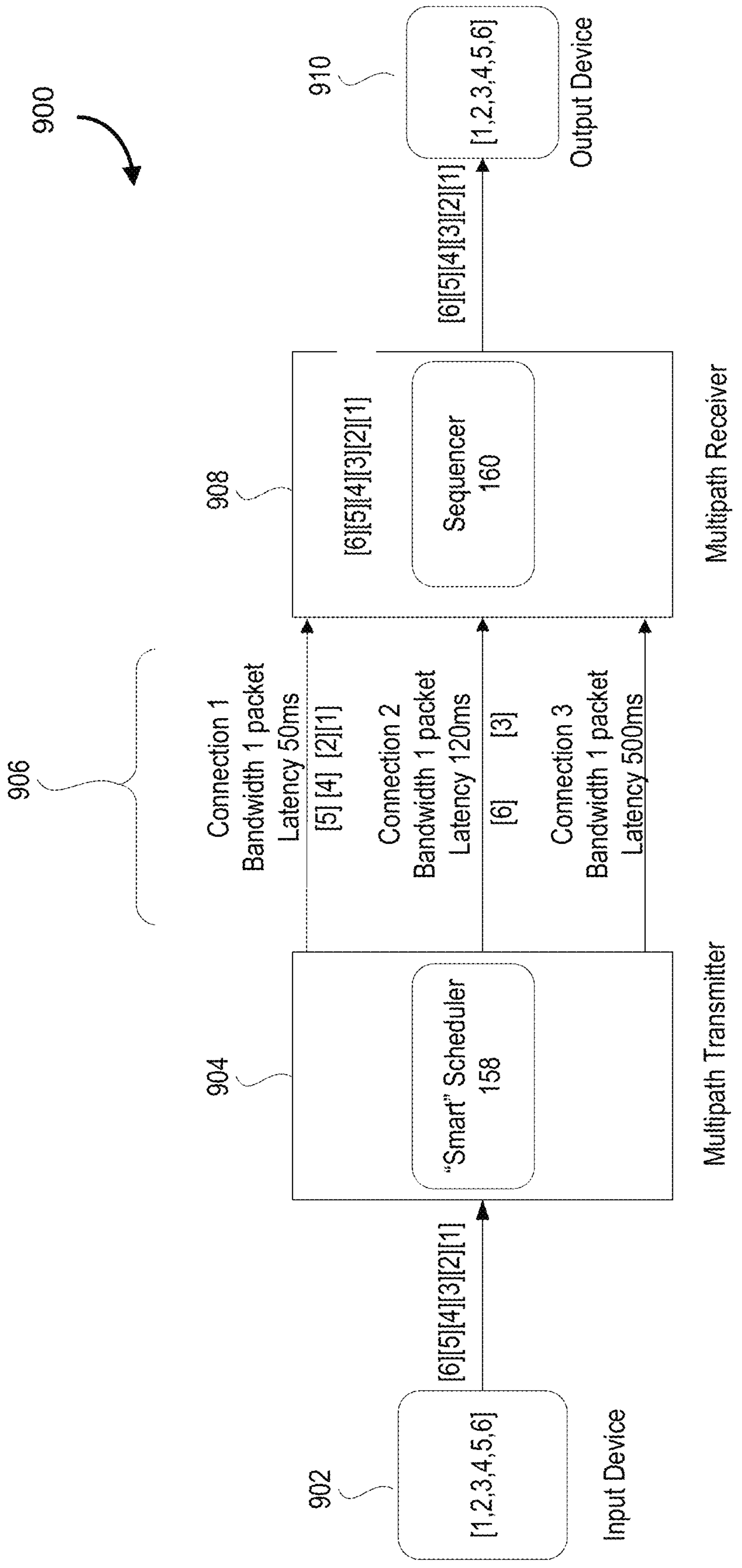
FIG. 9 is a block diagram showing components of an example transmission-side system, according to some embodiments.

As shown in diagram 900 of FIG. 9, there could be a smart scheduler 158 operating in conjunction with a regular sequencer 160. In this example, the multi-path transmitter 904 is adapted for modifying characteristics of the data packets from input device 902 during/prior to transmission across connections 906, which can include connection 1, 2, and 3. The sequencer 160 of multipath receiver 908 in this example may not be aware of the modified characteristics, and receives the data packets for delivery to output device 910.

Figure 10:
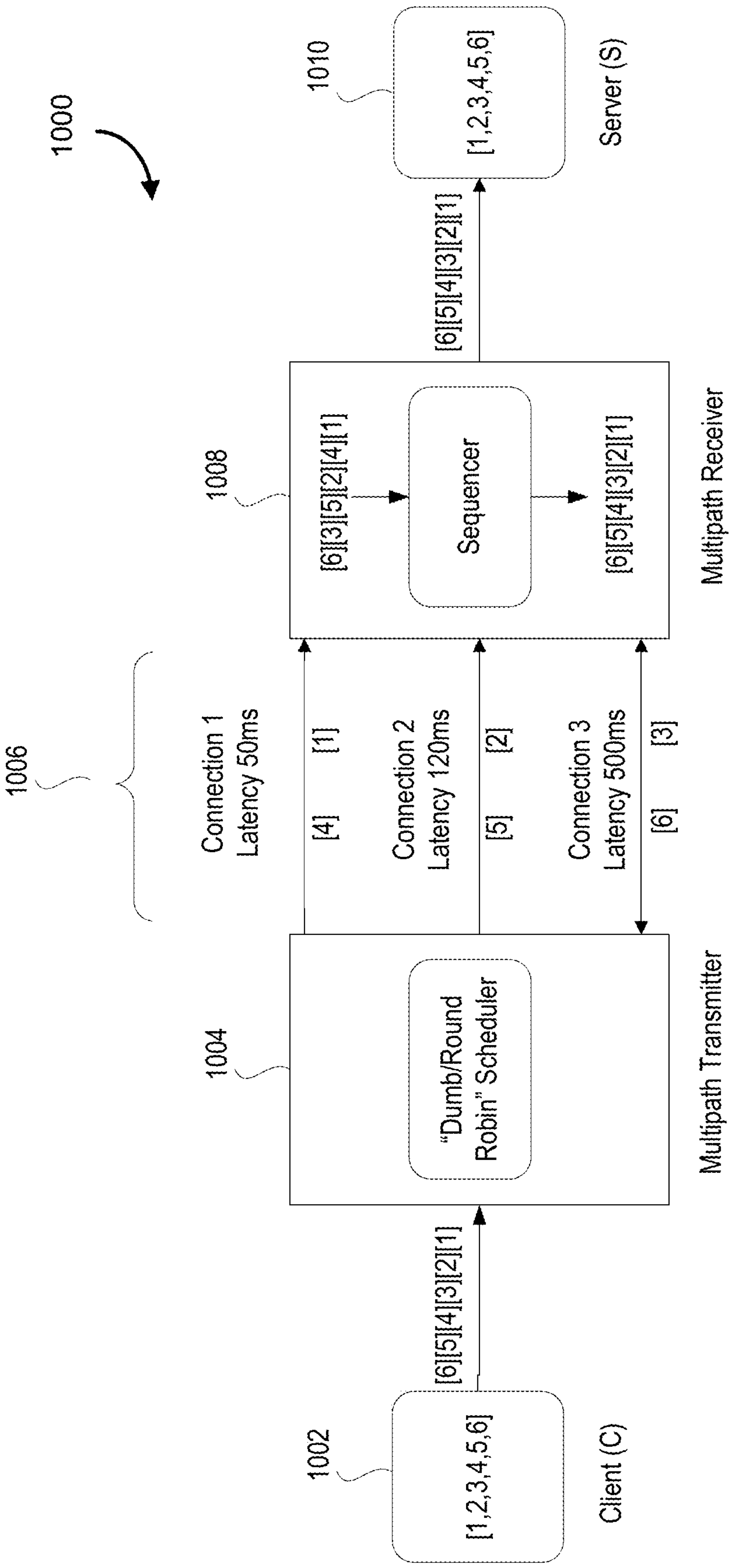
FIG. 10 is a block diagram showing components of an example receiver-side system, according to some embodiments.

As shown in diagram 1000 of FIG. 10, an alternate variation is possible where the scheduler of the multipath transmitter 1004 transmits the data packets from client 1002 without conducting packet spacing/pacing across connections 1006 and a buffer at the multipath receiver 1008 recognizes the sequence order and based on the timestamps and a communicated aggregate bandwidth (or other network characteristics), re-orders the data packets before flushing the data packets to server 1010.

Figure 11:
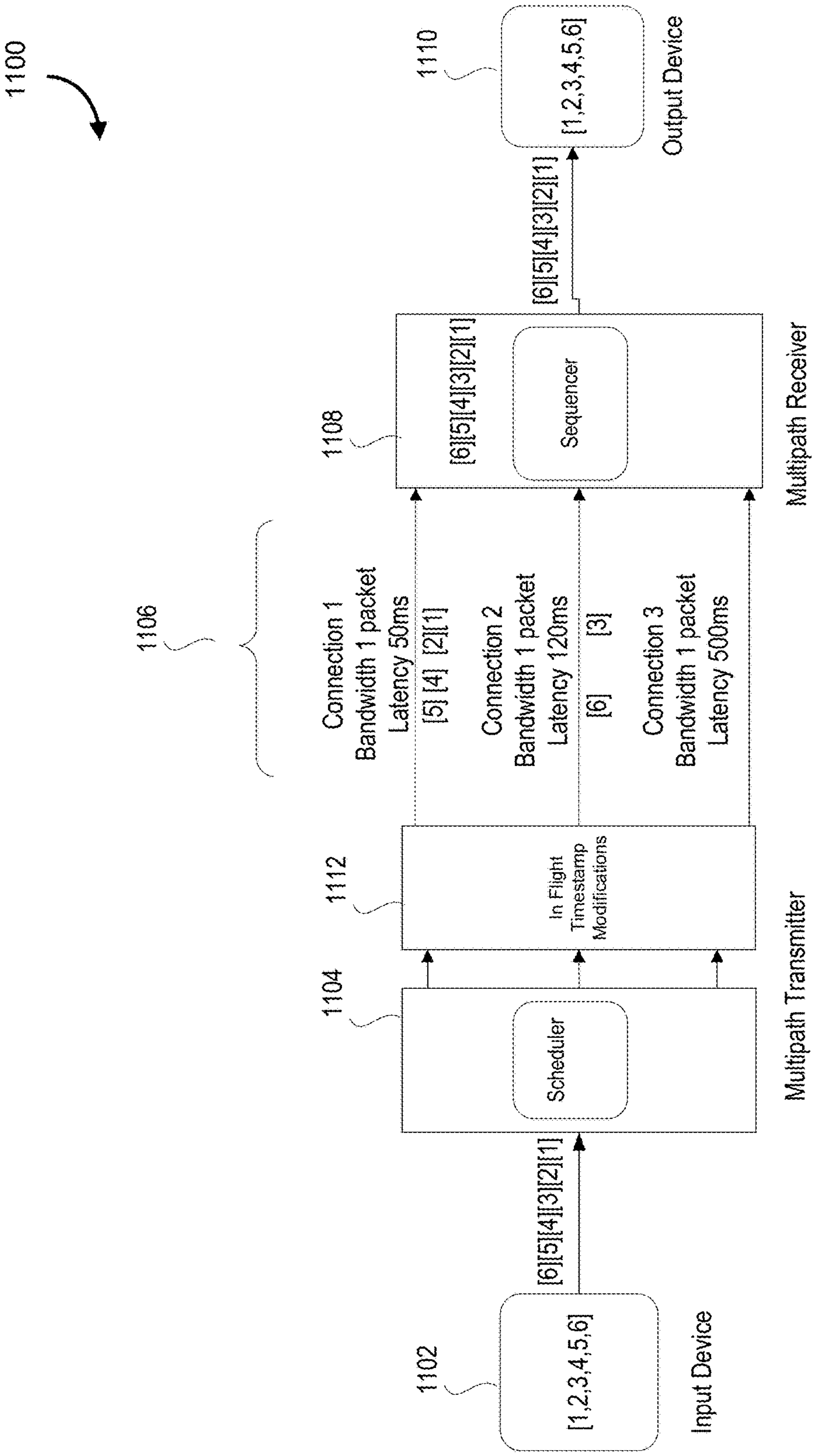
FIG. 11 Is a block diagram showing components of an example multi-path sender and receiver working in conjunction with intermediary network elements to modify in-flight packets, according to some embodiments

As shown in diagram 1100 of FIG. 11, another alternate variation is possible where the input device 1102 provides the data packets to the transmitter 1104 for transmission ultimately to output device 1110 through the receiver 1108. In this example, an in-flight modification coordination engine 1112 is adapted to control intermediate routers through which the data packets travel through based the aggregate bandwidth or other network characteristics. The intermediate routers then modify data packet pacing/spacing in accordance with various embodiments. The slowest intermediate router, in some embodiments, establishes the required spacing for all of the bonded connections.

Figure 12:
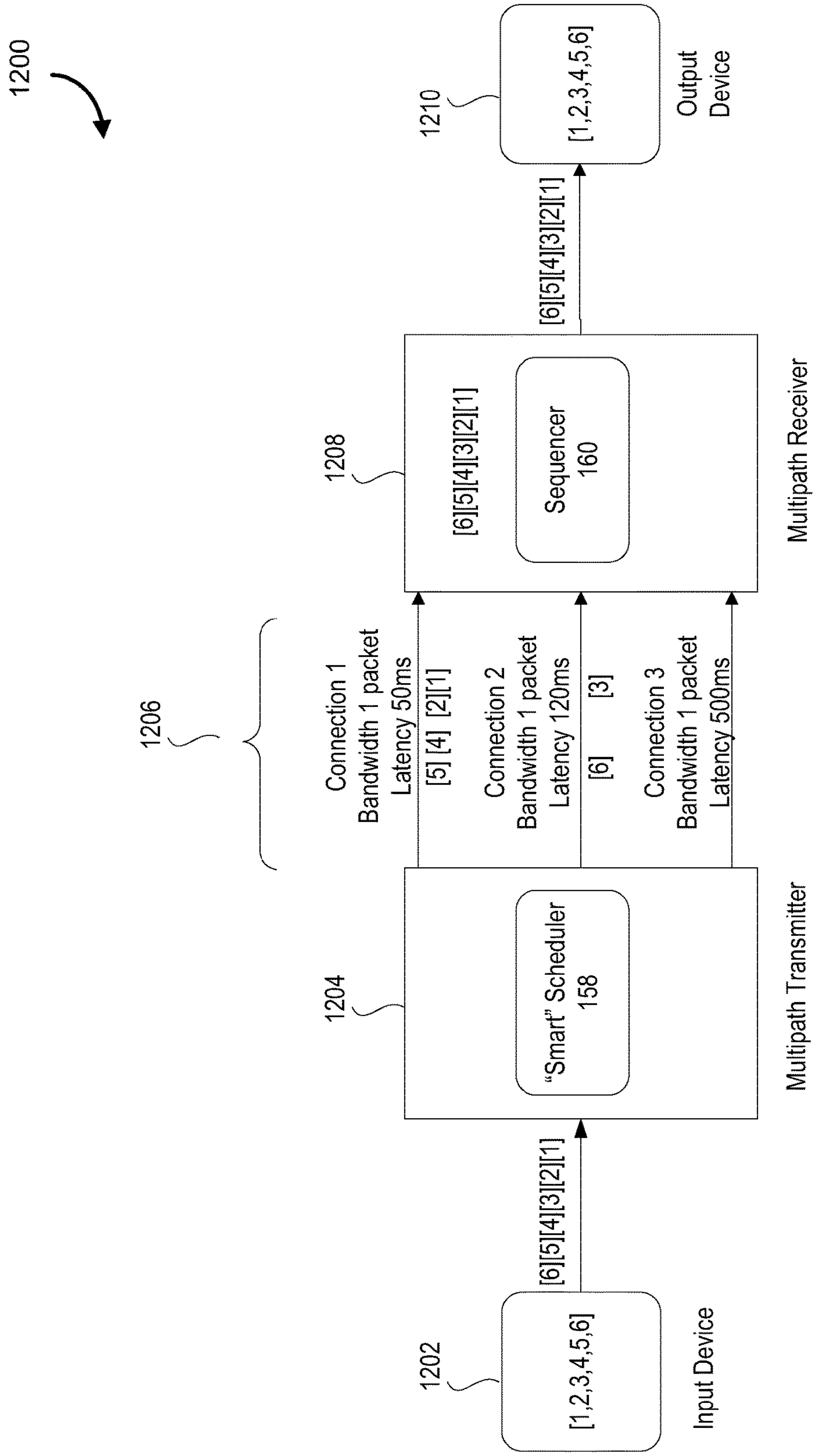
FIG. 12 is a block diagram showing components of an example transmission side and receiver-side system operating on conjunction, according to some embodiments.

As shown in diagram 1200 of FIG. 12, there could be a smart scheduler 158 operating in conjunction with a smart sequencer 160. In this example, greater complexity is utilized by the system where the smart scheduler 158 cooperates with the smart sequencer 160 in establishing and enforcing packet spacing mechanisms. For example, different roles may be assigned such that bi-directional traffic flow is spaced as for communications between the input device 1202 and the output device 1210, across multiple connections 1206. Different roles can include one of smart scheduler 158 or smart sequencer 160 modifying timestamps while the other establishes the buffering protocols.

FIG. 13 is a process diagram 1300, illustrative of a method for managing data packet delivery flow, according to some embodiments, showing steps 1302, 1304, 1306, and 1308. Other steps are possible, and diagram 1300 is an example for illustrative purposes.

Figure 14:
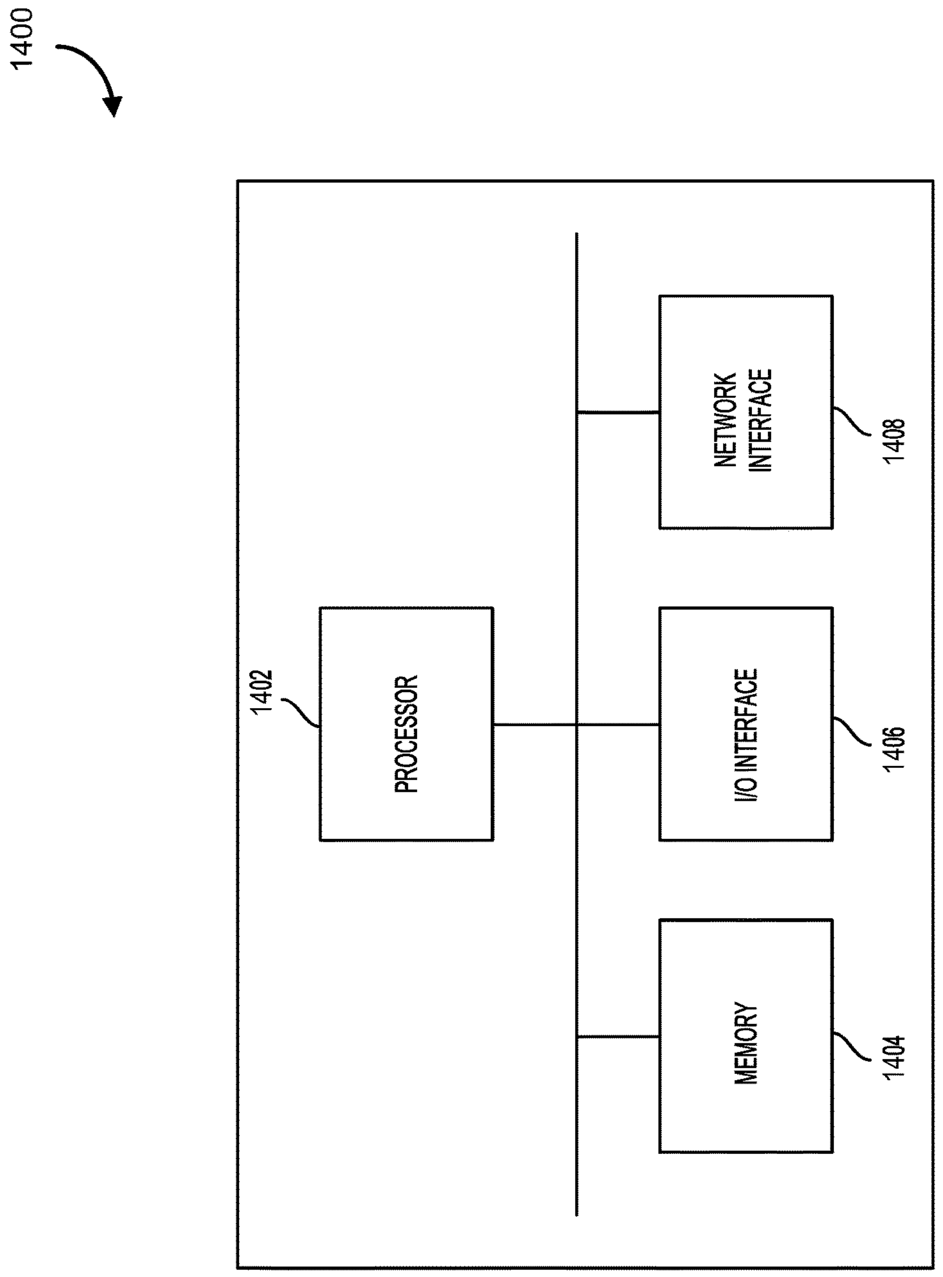
FIG. 14 is an example computing device, according to some embodiments.

FIG. 14 is a schematic diagram of computing device 1400, exemplary of an embodiment. As depicted, computing device 1400 includes at least one processor 1402, memory 1404, at least one I/O interface 1406, and at least one network interface 1408.

Each processor 1402 may be, for example, a microprocessor or microcontroller, a digital signal processing (DSP) processor, an integrated circuit, a field programmable gate array (FPGA), a reconfigurable processor, a programmable read-only memory (PROM), or combinations thereof.

Memory 1404 may include a combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1406 enables computing device 1400 to interconnect with one or more input devices, such as a keyboard, mouse, camera, touch screen and a microphone, or with one or more output devices such as a display screen and a speaker.

Each network interface 1408 enables computing device 1400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including combinations of these.

In a separate embodiment, a special purpose machine is configured and provided for use. Such a special purpose machine is configured with a limited range of functions, and is configured specially to provide features in an efficient device that is programmed to perform particular functions pursuant to instructions from embedded firmware or software. In this embodiment, the special purpose machine does not provide general computing functions. For example, a specific device, including a controller board and scheduler may be provided in the form of an integrated circuit, such as an application-specific integrated circuit.

This application-specific integrated circuit may include programmed gates that are combined together to perform complex functionality as described above, through specific configurations of the gates. These gates may, for example, form a lower level construct having cells and electrical connections between one another. A potential advantage of an application-specific integrated circuit is improved efficiency, reduced propagation delay, and reduced power consumption. An application-specific integrated circuit may also be helpful to meet miniaturization requirements where space and volume of circuitry is a relevant factor.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended embodiments are intended to include within their scope such processes, machines, manufacture, compositions of matter, means, methods, or steps.

As can be understood, the examples described above and illustrated are intended to be exemplary only.

What is claimed is:

1. A system for managing data packet delivery flow where one or more data packets within a burst of packets are being communicated across a set of multi-path network links, the system comprising:

a processor configured to:

monitor an aggregated throughput being provided through the set of multi-path network links operating together;

conduct packet spacing operations based at least on the monitored aggregated throughput and a non-zero floor value established by a minimum acceptable inter-packet spacing that is smaller than a required pace of the monitored aggregated throughput and relating to an ACK-clocked protocol such that if the one or more data packets are being communicated at a faster rate than the monitored aggregated throughput, the one or more data packets are delayed such that the one or more data packets appear to be communicated at the required pace;

wherein packet spacing operations are conducted by modifying one or more packet receipt timestamps corresponding to at least one data packet of the one or more data packets, and modification of the one or more packet receipt timestamps includes at least one packet receipt timestamp being corrected to reflect a future packet receipt timestamp; and wherein the required pace is established based upon a pace determined from receipt of non-redundant data packets of the one or more data packets, the non-redundant data packets distinguished from redundant packets of the one or more data packets through inspection of the one or more data packets; and wherein the modification of the one or more packet receipt timestamps occurs at least on an in-flight modification engine while the one or more packets are in flight.

2. The system of claim 1, wherein the one or more packet receipt timestamps are each provided in metadata associated with a corresponding packet of the one or more data packets.

3. The system of claim 1, wherein the packet spacing operations are adapted to restore to the one or more data packets a packet communications pace as if the one or more data packets were communicated across a single network link.

4. The system of claim 1, wherein the packet spacing operations are conducted when the one or more data packets are received at a connection de-bonding device configured to receive the one or more data packets from the set of multi-path network links and to re-generate an original data flow sequence.

5. The system of claim 1, wherein the packet spacing operations are conducted when the one or more data packets are transmitted at a connection bonding device configured to allocate the one or more data packets for transmission across the set of multi-path network links based on an original data flow sequence.

6. The system of claim 1, wherein responsive to changes in the monitored aggregated throughput, the processor is further configured to: determine what an ideal sequence of packet receipt timestamps is, and to correct inter-packet spacing of the one or more packet receipt timestamps on one or more data packets that not yet been communicated, such that modified and ideal packet receipt timestamps align across a duration of time.

7. The system of claim 1, wherein the modification of the one or more packet receipt timestamps occurs on the in-flight modification engine and at least one of (i) a sequencer on a receiving side, and (ii) a scheduler on a sending side.

8. The system of claim 1, wherein a data packet storing the aggregated throughput or missing information as a data field value is transmitted through an independent control channel and transmitted to at least one of a receiver device or a transmitter device.

9. The system of claim 1, wherein the processor is coupled to at least one of a receiver device or a transmitter device, and a complementary system is coupled to the other of the receiver device or the transmitter device such that the system and the complementary system operate substantially aligned packet spacing mechanisms to determine the aggregate throughput.

10. The system of claim 1, wherein the one or more data packets are received at a buffer for the one or more data packets, the buffer adapted to dynamically increase or decrease in size such that there is no fixed size to define a queue indicative of an order in which data packets are communicated; and wherein a subset of the one or more data packets are periodically removed from the buffer based on at least on a corresponding age of the one or more data packets in the queue.

11. A method for managing data packet delivery flow where one or more data packets within a burst of packets are being communicated across a set of multi-path network links, the method comprising:

monitoring an aggregated throughput being provided through the set of multi-path network links operating together; and conducting packet spacing operations by modifying characteristics corresponding to at least one data packet of the one or more data packets based at least on the monitored aggregated throughput and a non-zero floor value established by a minimum acceptable inter-packet spacing that is smaller than a required pace of the monitored aggregated throughput and relating to an ACK-clocked protocol such that if the one or more data packets are being communicated at a faster rate than the monitored aggregated throughput, the one or more data packets are delayed such that the one or more data packets appear to be communicated at the required pace;

wherein packet spacing operations are conducted by modifying one or more packet receipt timestamps corresponding to at least one data packet of the one or more data packets, and modification of the one or more packet receipt timestamps includes at least one packet receipt timestamp being corrected to reflect a future packet receipt timestamp; and wherein the required pace is established based upon a pace determined from receipt of non-redundant data packets of the one or more data packets, the non-redundant data packets distinguished from redundant packets of the one or more data packets through inspection of the one or more data packets; and wherein the modification of the one or more packet receipt timestamps occurs at least on an in-flight modification engine while the one or more packets are in flight.

12. The method of claim 11, wherein the one or more packet receipt timestamps are each provided in metadata associated with a corresponding packet of the one or more data packets.

13. The method of claim 11, wherein the packet spacing operations are adapted to restore to the one or more data packets a packet communications pace as if the one or more data packets were communicated across a single network link.

14. The method of claim 11, wherein the packet spacing operations are conducted when the one or more data packets are received at a connection de-bonding device configured to receive the one or more data packets from the set of multi-path network links and to re-generate an original data flow sequence.

15. The method of claim 11, wherein the packet spacing operations are conducted when the one or more data packets are transmitted at a connection bonding device configured to allocate the one or more data packets for transmission across the set of multi-path network links based on an original data flow sequence.

16. The method of claim 11, wherein responsive to changes in the monitored aggregated throughput, the processor is further configured to: determine what an ideal sequence of packet receipt timestamps is, and to correct inter-packet spacing of the one or more packet receipt timestamps on one or more data packets that not yet been communicated, such that modified and ideal packet receipt timestamps align across a duration of time.

17. The method of claim 11, wherein the modification of the one or more packet receipt timestamps occurs on the in-flight modification engine and at least one of (i) a sequencer on a receiving side, and (ii) a scheduler on a sending side.

18. The method of claim 11, wherein a data packet storing the aggregated throughput or missing information as a data field value is transmitted through an independent control channel and transmitted to at least one of a receiver device or a transmitter device.

19. A non-transitory computer readable medium, storing machine-interpretable instruction sets which when executed by a processor, cause the processor to perform a method for managing data packet delivery flow where one or more data packets within a burst of packets are being communicated across a set of multi-path network links, the method comprising:

monitoring an aggregated throughput being provided through the set of multi-path network links operating together; and conducting packet spacing operations by modifying characteristics corresponding to at least one data packet of the one or more data packets based at least on the monitored aggregated throughput and a non-zero floor value established by a minimum acceptable inter-packet spacing that is smaller than a required pace of the monitored aggregated throughput and relating to an ACK-clocked protocol such that if the one or more data packets are being communicated at a faster rate than the monitored aggregated throughput, the one or more data packets are delayed such that the one or more data packets appear to be communicated at the required pace;

wherein packet spacing operations are conducted by modifying one or more packet receipt timestamps corresponding to at least one data packet of the one or more data packets, and modification of the one or more packet receipt timestamps includes at least one packet receipt timestamp being corrected to reflect a future packet receipt timestamp; and wherein the required pace is established based upon a pace determined from receipt of non-redundant data packets of the one or more data packets, the non-redundant data packets distinguished from redundant packets of the one or more data packets through inspection of the one or more data packets; and wherein the modification of the one or more packet receipt timestamps occurs at least on an in-flight modification engine while the one or more packets are in flight.

* * * * *